(12) United States Patent
Peloso et al.

(10) Patent No.: US 10,915,128 B2
(45) Date of Patent: *Feb. 9, 2021

(54) METHOD AND SYSTEM FOR FACILITATING AUDITING OF POWER GENERATION AND ALLOCATION THEREOF TO CONSUMPTION LOADS

(71) Applicant: Sun Electric Digital Stream Ltd., Road Town (VG)

(72) Inventors: Matthew Peloso, Singapore (SG); Jean-Francois Vezina, Austin, TX (US)

(73) Assignee: Vikram Kumar, New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/749,528

(22) PCT Filed: Jun. 13, 2017

(86) PCT No.: PCT/SG2017/050298
§ 371 (c)(1),
(2) Date: Feb. 1, 2018

(87) PCT Pub. No.: WO2017/217933
PCT Pub. Date: Dec. 21, 2017

(65) Prior Publication Data
US 2019/0094898 A1 Mar. 28, 2019

Related U.S. Application Data

(63) Continuation of application No. 15/180,445, filed on Jun. 13, 2016, now Pat. No. 10,234,885.

(51) Int. Cl.
*G05F 1/66* (2006.01)
*G06F 8/65* (2018.01)
*G06F 21/33* (2013.01)

(52) U.S. Cl.
CPC .................................. *G05F 1/66* (2013.01)

(58) Field of Classification Search
CPC ......... G06F 8/65; G06F 21/33; H04L 47/783; H04L 63/0823; B60L 2260/54; H02J 3/008; Y04S 50/10; G05F 1/66
(Continued)

(56) References Cited

U.S. PATENT DOCUMENTS 9,124,098 B2 * 9/2015 Broniak .................... H02J 3/28
10,234,885 B2 * 3/2019 Peloso ....................... G05F 1/66
(Continued)

FOREIGN PATENT DOCUMENTS

AU 2015337129 6/2017
CA 2965490 4/2016
(Continued)

OTHER PUBLICATIONS

"International Application No. PCT/SG2017/050298, International Search Report and Written Opinion dated Sep. 12, 2017", (Sep. 12, 2017), 5 pgs.

*Primary Examiner* — Michael J Brown
(74) *Attorney, Agent, or Firm* — Schwegman Lundberg & Woessner, P.A.

(57) ABSTRACT

Method and system for facilitating auditing of power generation and allocation thereof to consumption loads, and a method and system of certifying generation and consumption transactional pairings over a contiguous power grid network. The method of facilitating auditing of power generation and allocation thereof to consumption loads comprises determining respective power generation time series for one or more power sources connected to a power grid; pairing the generation time series with one or more consumption loads connected to the power grid such that one generation time series is paired with one or more consumption loads and vice versa; and publishing publication data representing power generated by the power sources according to the measured power generation time series and
(Continued)

an allocation of the generated power to the consumption loads.

19 Claims, 16 Drawing Sheets

(58) Field of Classification Search
USPC .......................................................... 700/296
See application file for complete search history.

(56) References Cited

U.S. PATENT DOCUMENTS

2003/0220720 A1    11/2003  Shimode et al.
2010/0231160 A1*    9/2010  Shaffer ............... H01M 10/441
                                                              320/101
2015/0081374 A1     3/2015  Sahlstrom et al.

FOREIGN PATENT DOCUMENTS

| CN | 105531689 | 4/2016 |
| JP | 2002112458 | 4/2002 |
| JP | 2016536718 | 11/2016 |
| WO | WO-2015039122 | 3/2015 |
| WO | WO-2016032396 | 3/2016 |
| WO | WO-2016064341 | 4/2016 |
| WO | WO-2016064342 | 4/2016 |
| WO | WO-2017217933 | 12/2017 |

\* cited by examiner

METHOD AND SYSTEM FOR FACILITATING AUDITING OF POWER GENERATION AND ALLOCATION THEREOF TO CONSUMPTION LOADS

PRIORITY CLAIM TO RELATED APPLICATIONS

This application is a U.S. national stage application filed under 35 U.S.C. § 371 from International Application Serial No. PCT/SG2017/050298, which was filed 13 Jun. 2017, and published as WO2017/217933 on 21 Dec. 2017, and which claims priority to U.S. application Ser. No. 15/180, 445, filed 13 Jun. 2016, which applications and publication are incorporated by reference as if reproduced herein and made a part hereof in their entirety, and the benefit of priority of each of which is claimed herein.

FIELD OF INVENTION

The present invention relates broadly to a method and system for facilitating auditing of power generation and allocation thereof to consumption loads and to a method and system of certifying generation and consumption transactional pairings over a contiguous power grid network.

BACKGROUND

To date, renewable energy certification has been done primarily on paper or solely through the observation of generation yield (eg. Carbon credits, or renewable energy certificates abbreviated herein as "REC's"). For example, a guarantee of the origin of energy generated from a renewable energy generator may be created upon generation of the renewable energy recording the total renewable energy yield, and this guarantee of origin can be on-sold to buyers in a financial market, or over the counter. Such a generation yield may be combined with various other generation sources to serve a consumer load. In such a circumstance an auditor is often required to account for the energy certificates or guarantees, as the case may be, to safeguard the trade of these certificates.

Such a certification may be suitable where the market for trade of such systems is liquid and functional. However, this certification leads to reduced transparency of transactions where regions do not have standards established for trade of such guarantees of origin or renewable certificates. This certification as well requires that an auditor be appointed to verify and check the specific information associated with the generator, the information of the certificate or guarantee of origin, the metering scheme used for measuring the energy yield from the generator, and other technical matters associated with the generation. Moreover, this certification today does not accommodate for the analysis of actual consumption as coupled to generation on a contiguous power grid network which establish the supply and demand characteristics of an energy market. Moreover, more frequently today, energy consumers wish to make statements in respect of the relative renewable energy consumed, for example, claiming and/or certifying that they consume 50% or 100% renewable energy in respect of their energy use through renewable energy generators.

In addition to the above problems, the actual yield of an intermittent resource cannot be predicted at any time, and as well the actual use of energy of a specific load is unpredictable, wherein the load may ultimately be utilizing a certificate or guarantee of origin to make a statement on the contribution of clean energy to its usage. As such, establishing the trade of energy from intermittent renewable resources to date still lacks transparency, and requires multiple parties to audit the trade of these certificates even where market standards for the trade of renewable certificates exist. This is often done on the basis that generation credits are simply bought and added up retrospectively to equate to a historically observed nominal consumption.

Furthermore, sometimes the renewable, or intermittent, generators are also combined with various conventional energy sources and it is hard to characterize an actual blend of energy sources associated with the electrical consumption load.

Embodiments of the present invention seek to provide a method and system for facilitating auditing of power generation and allocation thereof to consumption loads and a method and system of certifying generation and consumption transactional pairings over a contiguous power grid network that seek to address one or more of the above problems.

SUMMARY

In accordance with a first aspect of the present invention there is provided a method of facilitating auditing of power generation and allocation thereof to consumption loads, comprising determining respective power generation time series for one or more power sources connected to a power grid; pairing the generation time series with one or more consumption loads connected to the power grid such that one generation time series is paired with one or more consumption loads and vice versa; and publishing publication data representing power generated by the power sources according to the measured power generation time series and an allocation of the generated power to the consumption loads.

In accordance with a second aspect of the present invention there is provided a method of certifying generation and consumption transactional pairings over a contiguous power grid network, comprising measuring time series data from a plurality of generation meters and consumption meters into a database in real time; processing the measured time series data through an algorithm to derive a result in association with a set of meter pairings between the generation meters and the consumption meters; and publishing the derived result in real time, at selected times or at selected time intervals.

In accordance with a third aspect of the present invention there is provided a system for facilitating auditing of power generation and allocation thereof to consumption loads, comprising means for determining respective power generation time series for one or more power sources connected to a power grid; a processor for pairing the generation time series with one or more consumption loads connected to the power grid such that one generation time series is paired with one or more consumption loads and vice versa; and a publication platform for publishing publication data representing power generated by the power sources according to the measured power generation time series and an allocation of the generated power to the consumption loads.

In accordance with a fourth aspect of the present invention there is provided a system for certifying generation and consumption transactional pairings over a contiguous power grid network, comprising a database; a plurality of generation meters and consumption meters configured for measuring time series data into the database in real time; a processor for processing the measured time series data through an algorithm to derive a result in association with a set of meter pairings between the generation meters and the consumption meters; and a publishing platform for publishing the derived result in real time, at selected times or at selected time intervals.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION OF PREFERRED EMBODIMENTS

Figure 1:
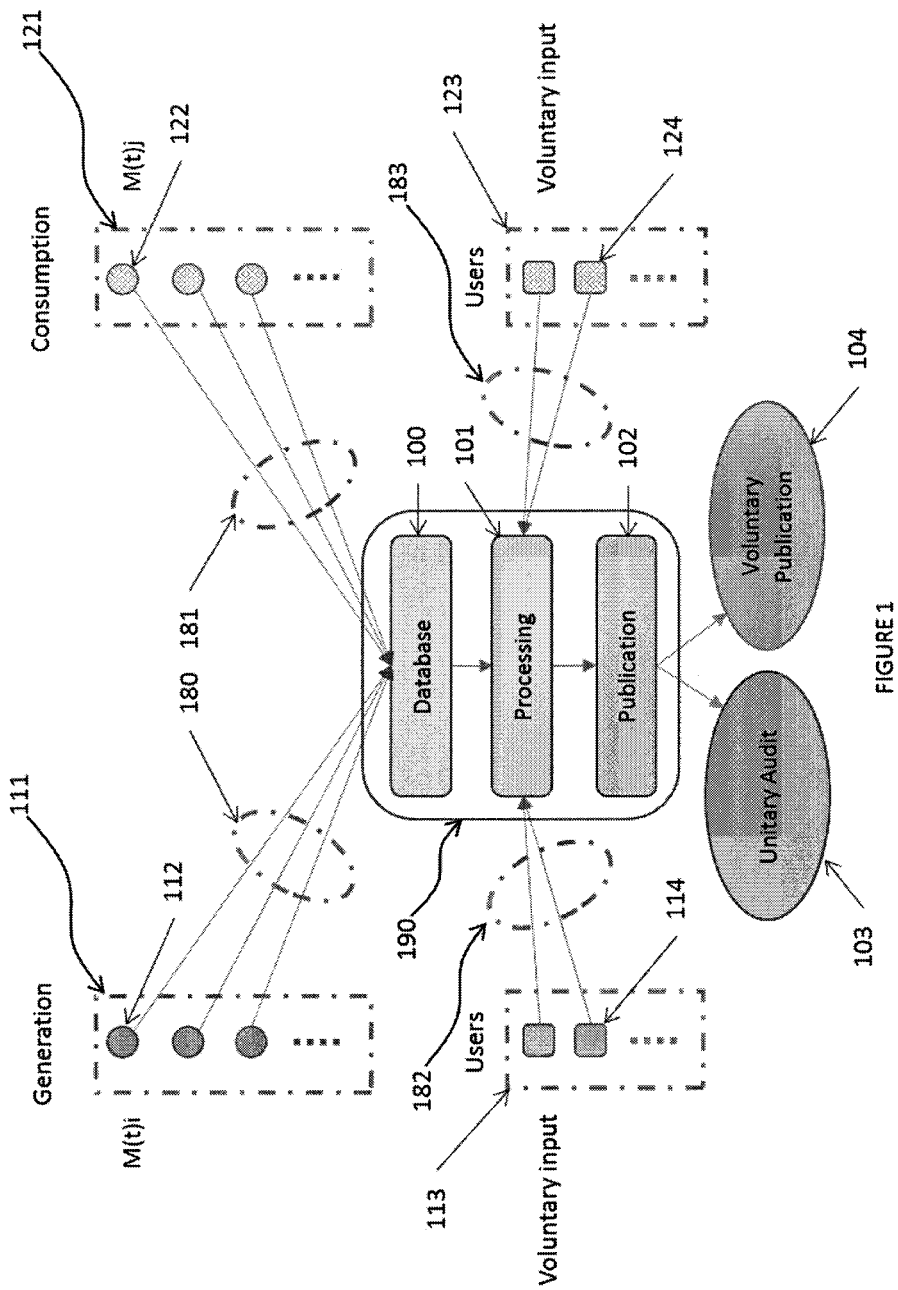
FIG. 1 shows a schematic drawing illustrating architectures of energy meters of generators and consumers associated with an information technology system comprising user settings, and a database that is populated and processed in real time leading to publication of information derived from the readings, according to an example embodiment.

Embodiments of the present invention relate broadly to a system and method of determining and certifying a relative amount of energy generated from one or more power generator allocated to an energy consumption load such that the consumer load may forecast penetration of the energy resource to the load, establish a metering pairing for certification of the established penetration of the energy resource, and an audit may access and process information to verify the penetration of energy to the load. This penetration may be performed on the basis of time analysis of generation and consumption events as connected on a power grid transmission network. Such a generation source may implement an intermittent energy source, or a combination of dispatchable and intermittent energy resources, where typically renewable energy resources may be stochastic in nature and characterized as intermittent. Moreover, energy storage devices may be connected to the power grid network through the energy grid, or connected indirectly through loads of the power grid network, and advantageously meters such that the two way flow of energy from the storage device (such as a chemical battery storage device) may be used to provide energy on the power grid network. Publication of certificates are enabled to provide for a transactional certificate among meter pairings. The system is configured for publishing associated and derivative information such that certain information may be rendered confidential while other information may be made public for the purpose of simplifying an audit system of energy consumption and generation over a contiguous power grid network. The system is enabled such that the real time flows of information are consistently measured, and computed through a properly configured filter, such that the resulting real time information available provides up to date and relevant information in regard the energy transactions in real time. It is noted that in different embodiments, the computing or processing may be performed at selected times or at selected time intervals instead of in real time.

The present specification also discloses apparatus for implementing or performing the operations of the methods. Such apparatus may be specially constructed for the required purposes, or may comprise a device selectively activated or reconfigured by a computer program stored in the device. Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a device. The computer readable medium may also include a hard-wired medium such as exemplified in the Internet system, or wireless medium such as exemplified in the GSM mobile telephone system. The computer program when loaded and executed on the device effectively results in an apparatus that implements the steps of the method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Embodiments of the present invention for implementation of an advanced certification system involve a consideration of the kind of information accessible or made open in an audit or publication. The simple publication of all information openly may not be preferred as the consumer or generator may be interested in maintaining confidentiality of some of the information associated with their consumption or generation. Some of the information may as well be less relevant in respect of certifying a renewable attribute on the consumer, or a time related characteristic of generation and consumption events. Publication of a subset or derivative set of information can serve the purpose of an audit as well as maintain confidentiality of certain information which is not required to be published. An element of information "destruction", such as hashing functions, and elements of randomness are preferably introduced into certification processes in example embodiments, at least somewhere between the raw information obtained about energy generation or consumption and the publication of the derivative information.

To remedy the lack of transparency and trade in some markets in the prior art, an open information standard may be implemented in example embodiments to construe the physical transactions. In example embodiments, smart metering units may be used and their specifications presented publicly along with information associated with allocation pairs between generation source and consumption load of electrical energy. Such an open information standard can be able to simplify the certification requirements and create a physical measurement standard that allows more participants to verify the origins of energy generated and supplied through a power grid network.

Embodiments of the present invention provide a system and method for auditing the allocation of energy among energy generators (for example intermittent energy generators) and consumption loads such that a specified level of penetration or a specified percentage blend of energy from the energy source to the load can be determined. By opening the information obtained through the open information standard any party may obtain and access allocations, which can improve on the transparency of information presented to them, while any other party may cross check paired allocations and historical as well as future information among energy allocations so as to verify the origin and guarantee of such energy. This preferably also serves in addition to certify the time correlations of events of energy generation and energy consumption among various electrical components configured among a contiguous electrical power grid transmission system.

FIG. 1 shows a schematic drawing illustrating an architecture of energy meters of generators and consumers associated with an information technology system comprising user settings, and a database that is populated and processed in real time leading to publication of information derived from the readings, according to an example embodiment. Measurements of real time energy flows are provided for through a plurality of energy meters 111 and 121, and fed in real time to a database 100. Energy meters 111, for example meter unit 112, are enabled for providing generating data to database 100 while energy meters 121, for example meter unit 122, and are enabled for providing load data to a database 100. The information is encrypted prior to being sent to the database through communication links 180 and 181 (respectively, for the set of generation meters 111 and the set of load meters 121), and is maintained within the database in a secure form. The communication between the meters 111, 121 and the database 100 can be compressed with Lempel-Ziv-Oberhumer (LZO) and encrypted via a VPN tunnel (Virtual Private Network is abbreviated as VPN) in an example embodiment and can use a variety of VPN software and encryption cyphers, for example using OpenVPN for the tunnel and encrypted using Blowfish in Cipher Block Chaining mode (BF-CBC) cypher. The only access to the database 100 is internally on the server or with a VPN connection to the server 190. The Web interface of the server 190 which exposes data from the database 100 will be using filters as described herein and advantageously will not reveal another user's raw clean energy consumption data unless the user agrees to release that information. The filter algorithms may be made publically available or to the auditors.

In FIG. 1, a set of generation meters 111 are individually communicating through a secure VPN channel 180 into database 100, and individual generation meters e.g. 112 are installed within each distributed generator to record energy generation information remotely. M(t)i denotes data from individual generation meters e.g. 112 as read in real time providing relevant time series information, and M(t)j denotes data from individual consumption meters e.g. 122 as read in real time providing relevant time series information. It can be noted that new time series data may be derived from the original time series data M(t)i,j obtained from the meters e.g. 112, 122.

The generators may be embedded energy generators within a building, for example photovoltaic generators, and the metering scheme may be established under a variety of meter reading consolidation systems, for example, as described in WO 2016/032396, WO 2016/064342 and/or WO 2016/064341. I.e. the metering scheme could be directly or indirectly measuring generation data supplied to an electrical power grid. In addition, a set of electrical load meters 121 are individually communicating through a secure Virtual Private Network (VPN) channel 181 into database 100. Advantageously, generators could include other dispatchable generators, or potential battery storage or other forms of energy storage. There is no limitation to the kind of generator or power supply device/system that can be used to provide energy through the power grid network.

Figure 3:
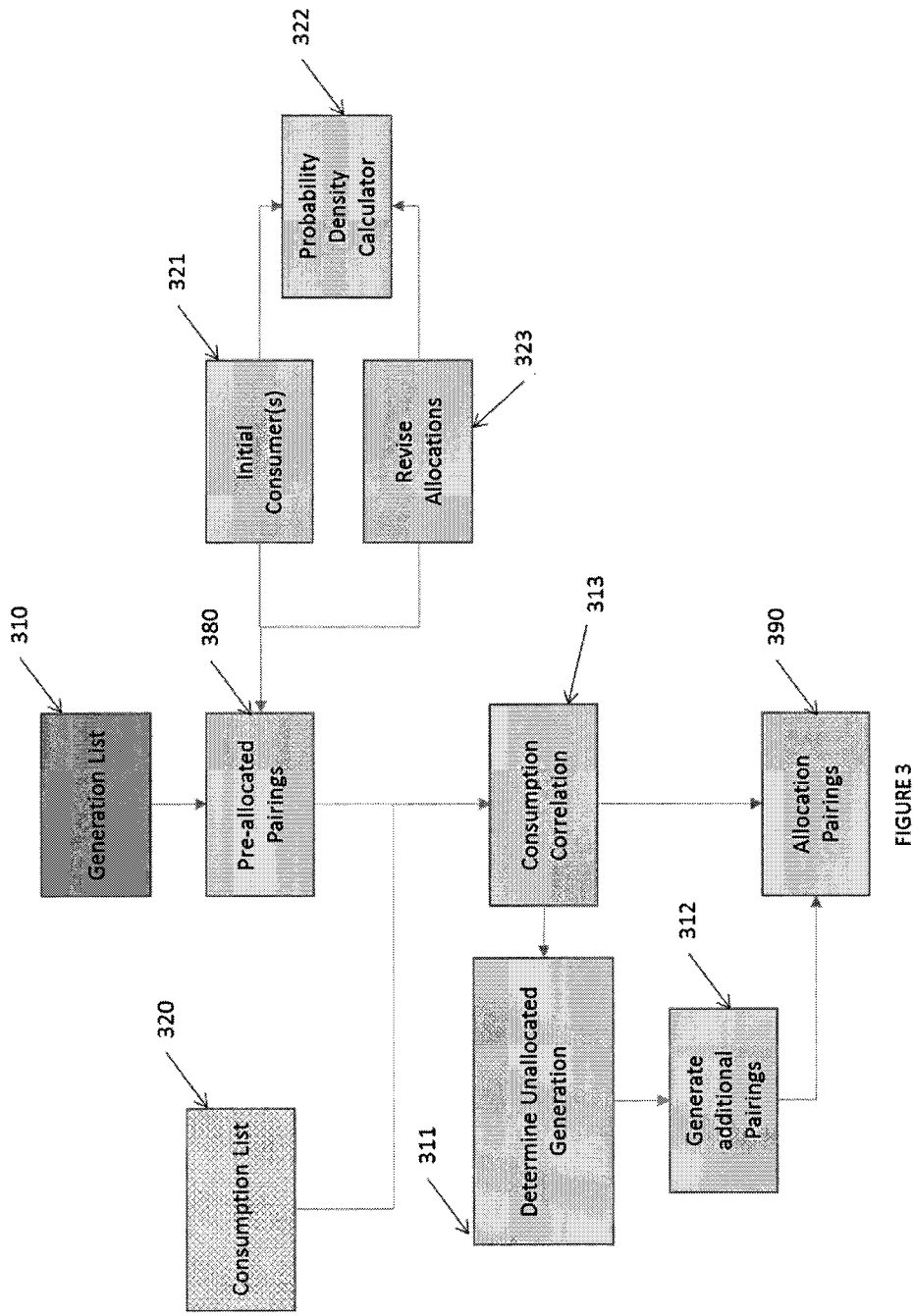
FIG. 3 shows a schematic drawing illustrating a procedure, process, or method from which meter allocation pairings are established to be stored for a database, according to an example embodiment.

Pairings among the meter readings are established with time indexing such that cross correlations on energy generation or consumption at loads may be made. In FIG. 1, information from the database 100 is processed using apparatus 101 which may comprise of a central processing unit that is performing the allocation algorithm which is pairing generation to consumption as shown in FIG. 3. Publication 102 from the database 100 and as processed through element 101 (which is referred herein as a filter in addition to a processing system) may result in Voluntary Publication 104 (also referred to as "Self-Publication"), or Unitary Audit 103, as referred to within this document. Unitary Audit 103 is a resulting certification among meter pairings, or as derived from the generation meters, such that established allocations among electrical meters can be determined to be distinct and not overlapping. I.e. Electricity generated and allocated to loads was proportionally supplied only once and not allocated more than once or more than once. Voluntary Publication 104 is published such that additional user information is made accessible for presentation by configuration of external or internal users 113 and 123 and associated with generation and consumption, respectively. Communication of user settings for generation associated users 113 or electrical load associated users 123, respectively, may be done, for example, by login of the user through the World Wide Web (WWW) using communication channels 182 and 183, respectively. Preferably, a Secure Socket Layer (SSL) protocol secures the point to point communications 182 and 183 between the respective users and the server. An auditor may then receive the algorithm as utilized at the processor along with the resultant output of publication so as to certify certain characteristics of the energy generation, allocations, or transactions as occurring among energy meters without necessarily needing to obtain the actual meter readings, which may include confidential information.

Label 124 is an example of an electrical load user, and label 114 is an example of a generation user. The database 100 is established with a number of settings which users can select, and can obtain information from the users. Such information becomes associated with the appropriate generation meter 111 or electrical load meter 121 through the database 100. For example, an electrical load user can specify to share or not share his physical address, company name, logo, clean energy ratio, clean energy consumption, and overall consumption. In addition, associated data of a consumer load may include any and all technical specifications of the load such as its electrical capacity, design documentation, and other associated information. A generation user can specify to share or not share his physical address, distance between the generator and consumer, company name, and logo. In addition, associated data of a generator may include any and all technical specifications of the generator such as its name plate capacity which may be defined from either the direct current capacity or the alternating current capacity, the make, design documentation, and other associated information. An implementation for providing user options which can be configured will be described below with reference to FIG. 7.

The process of satisfying allocations begins with a time series from each generator containing the amount of energy generated for a specified period of time (e.g. a day, or a half hour etc.). These time series are sent to the highest priority allocation level, where allocations are made to consumer load(s) and those allocations are subtracted from the time series. The resulting time series that are left over propagate to the next lower priority allocation level. This process repeats until all priority allocation levels have been run.

In one example embodiment, there are four priority levels that each take portions of the energy generated and create allocations containing an amount and an assignee, i.e. consumer load(s). These four priority levels consist of reserved allocations, dedicated allocations based on a forecaster, allocations for meeting targets for products according to decreasing priority, and finally allocations to non-priority products. Reserved allocations are percentages of generator output which are reserved for specific load(s) to meet a peak kW generation regardless of the nominal amount of consumption at the load. These loads consume a partial or full amount of the respective generator's output for one or more generators. Once reserved allocations are taken out of the generation and consumption time series, the resulting time series are then sent to the next priority level, which is a dedicated allocation based on the results obtained from using a forecaster to meet target clean energy ratios. A target load with the requirement of having a clean energy percentage target would obtain a dedicated allocation from a forecaster which uses a probability density calculator to calculate the percentage of the specific generator(s) output needed to meet a desired ratio with a customer's load(s) profile(s). This ratio could be established by requiring a specific percentage of power to be generated from a particular generator or generators in respect of the load(s)' consumption, or a penetration ratio to the load at a specific time. The dedicated allocations are generated using the pre-calculated dedicated percentages and are preferably set such that they would not exceed a specific load or set of loads. Once dedicated allocations are taken out of the generation and consumption time series, the resulting time series are then sent to the allocations for meeting targets for products according to decreasing priority allocation level. This allocation level observes how the current priority loads are actually doing allocation-wise, and is implemented to assist in establishing specific target ratios, and may make more allocations towards loads that have not yet met their target ratios following the dedicated allocations. Again, the allocations will preferably be set such that they would not exceed a specific load or set of loads. Once those allocations are taken out of the generation and consumption time series, the resulting time series are then sent to the non-priority allocation level, which simply splits the remaining energy time series amongst all the customers' loads by creating allocations for each while preferably not exceeding the respective loads. After these allocation priority levels have processed, it is expected there would be no remaining un-allocated energy, if the loads consumed as much as or more than the amount generated by the generators considered in the allocation process.

Figure 2:
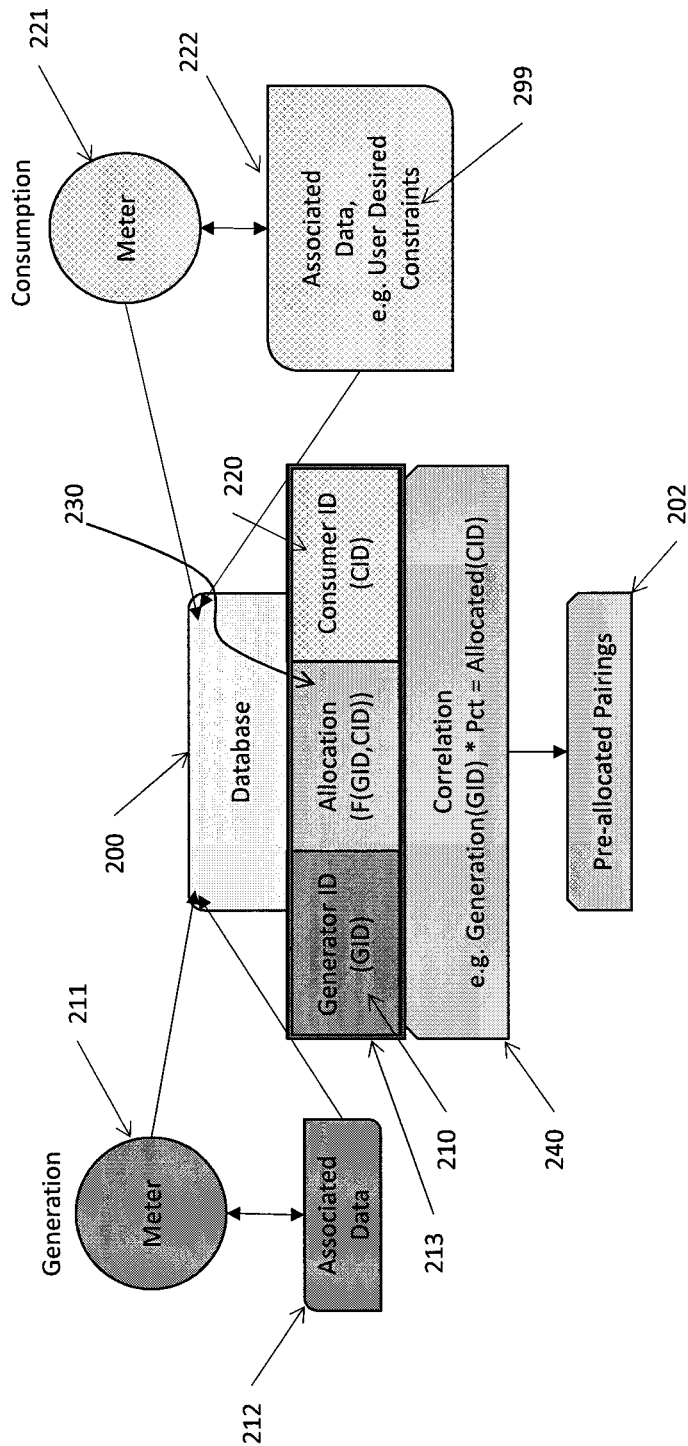
FIG. 2 shows a schematic drawing illustrating a system of pairing generation and consumption readings for establishing an output, according to an example embodiment.

FIG. 2 shows a schematic drawing illustrating a system of pairing generation 211 and consumption 221 readings for establishing a pre-allocated pairing 202, according to an example embodiment. In FIG. 2, percentages of the generation on each generator can be pre-allocated or reserved for the consumption of specific electrical load users. With this architecture, a fraction of a specific meter reading can be allocated into a cross pairing of meter readings. Pre-allocated pairings are determined prior to generating the energy and are applied during energy production. The consumption at a load of an electrical user will be measured at the meter 221 and stored in the database 200. The generation will be measured at the meter 211 and stored in the database 200. Each meter is coupled with its associated data 212 and 222 which is stored in the database 200. The associated data 212, 222 for both the generation and consumption contains an identification which identifies the meter with a generator identification (ID) and consumer ID respectively in an example embodiment. A pre-allocated pairing information 213 in one embodiment contains a generator ID 210, an allocation percentage 230 and a consumer ID 220. All energy generated within a time interval from a generator with generator ID 210 that have a pre-allocated pairings entry 213, will go through correlation equations 240 and store the reserved output 202 ("Pre-Allocation Pairings"), i.e. the resulting allocation time series based on correlation equation 240 in an example embodiment, in the database 200. It is noted that correlation equation 240 can take various forms depending, inter alia, on the type of supply product or user desired constraints 299 a particular user has subscribed to, including that only a fraction of a measured consumption time series may be considered for the allocation. Examples of different types of supply products or user constraints are described, for example, in WO 2016/064342 and/or WO 2016/064341.

FIG. 3 shows a schematic drawing illustrating a procedure, process, or method, for implementation on apparatus, from which meter allocation pairings are established to be stored for a database (compare 100 in FIG. 1, 200 in FIG. 2), according to an example embodiment. A generation list 310, a consumption list 320, and pre-allocated pairings 380 are gathered from the database (for example from database 200, FIG. 2, or database 100, FIG. 1). In the consumption correlation 313 process, consumption from consumption list 320 is correlated with the pre-allocated pairings 380 and the unallocated generation obtained from "Determine Unallocated Generation" segment 311 is identified by aggregating the total generation and removing allocated energy according to the pre-allocated pairings 380 which will be limited to the respective consumer's maximum consumption during each time interval. This unallocated generation "pool" is then distributed amongst all users in an example embodiment, using an algorithm which favors priority customers and thus creating new or additional allocation pairings 312. The energy sum of the allocation pairs 380 and 312, aggregated as allocation pairings 390, will thus be equal to the aggregate of all generation. The pre-allocated pairings 380 are either generated from being an initial consumer 321 or revised to meet new needs or adjusted to weather changes such as seasonal for intermittent sources, or adjusted to control changes for dispatchable sources, as indicated at numeral 323. Calculations can use a probability density calculator 322 based on, for example, historical data for generation and/or consumption to attempt to predict the generation needed to meet the consumer's needs and build and/or revise the pre-allocated pairings 380. Details of a suitable probability density calculator are described, for example, in WO 2016/064341. Advantageously, such a system of allocation allows priorities of access to multiple energy generation resources to be provided for, and various mixes of energy sources to be subscribed to for supply to consumer loads prior to the supply dates by using a predictive forecasting module.

Figure 4:
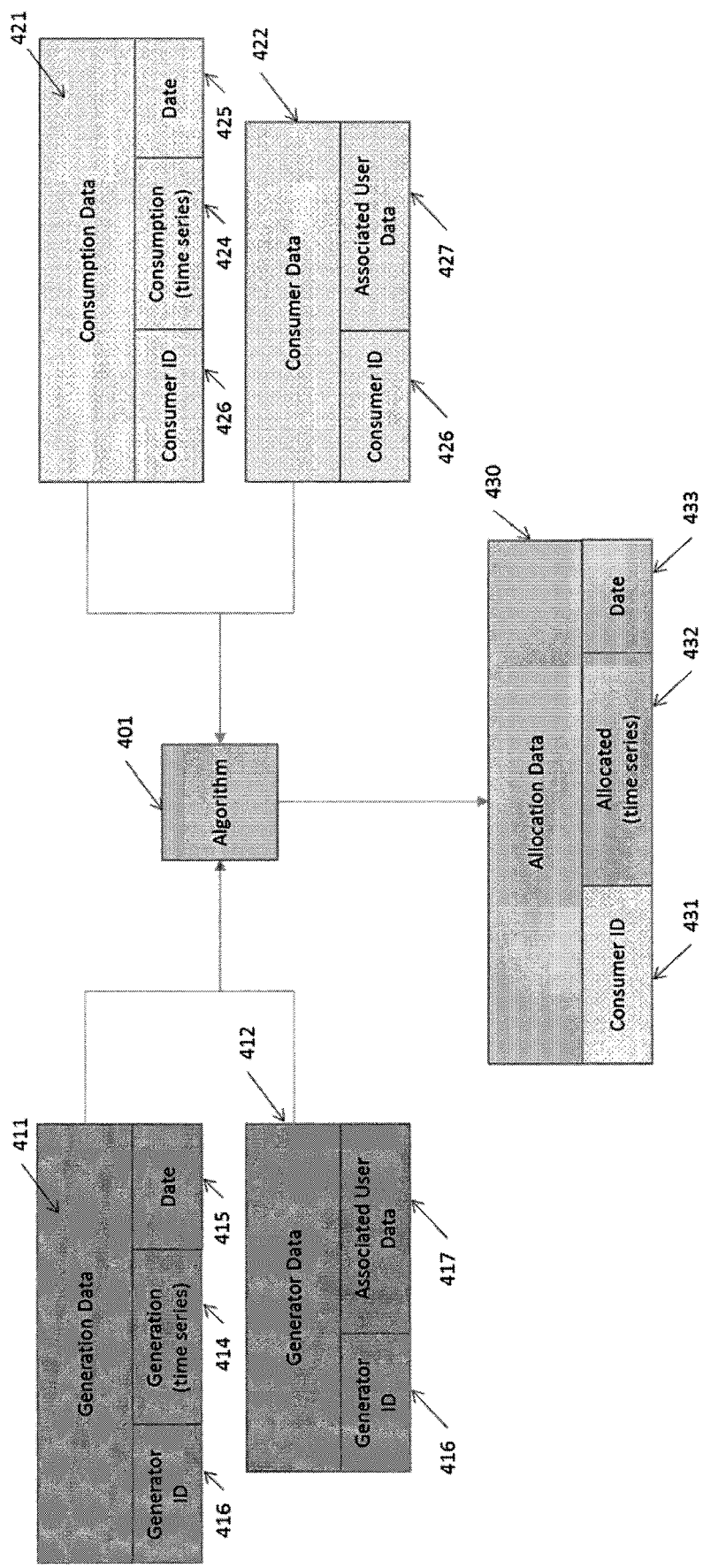
FIG. 4 shows a schematic drawing illustrating a database structure for the paired identifications among electrical generators, electrical loads, and resulting allocation pairings of the meters, according to an example embodiment.

The database structure (compare database 100, FIG. 1, or database 200, FIG. 2) according to an example embodiment is specified in FIG. 4. Data from multiple generation and consumption database tables (411, 412, 421, 422) are processed using an algorithm 401 (compare FIG. 3 a corresponding description above) and the resulting allocation data 430 is stored in the database. Associated generator user data 417 that is associated with a generator is stored in the generator data 412 table and assigned a unique generator ID 416. Generation data 411 contains data that is unique to a date 415 and the generator ID 416 along with the corresponding generation time series 414 for that date, in an example embodiment. Associated consumer user data 427 that is associated with a consumer is stored in the consumer data 422 table and assigned a unique consumer ID 426. Consumption data 421 contains data that is unique to a date 425 and the consumer ID 426 along with the corresponding consumption time series 424 corresponding to said date 425, in an example embodiment. Correspondingly, the algorithm may call consumption data 421 with associated consumer ID 426 and consumption time series 424, as well as consumer data 422 with corresponding consumer ID 426 and associated user data 427. The tables 411, 412, 421, 422 are structured in an example embodiment to minimize the information space used, such that records that are reoccurring only contain the necessary data and the consumer ID 426 and generator ID 416 are the identifiers used to link the data to a specific entity. The resulting allocation data 430 includes allocation data according to the pre-allocation paring for the user and optionally allocation data derived from additional allocation from the unallocated generation "pool" (compare FIG. 3 and corresponding description above). While consumer ID 431 is shown to be associated with the allocation data 430 as represented in FIG. 4, it will be appreciated that the database structure is such that the allocation data 430 for each user can be decomposed into allocation(s) 432 and respective date 433 from the individual generators as identified within the database structure by way of their generator IDs 416. This can enable self-publication of specific data derived from user settings, as will be described below in more detail.

Figure 5:
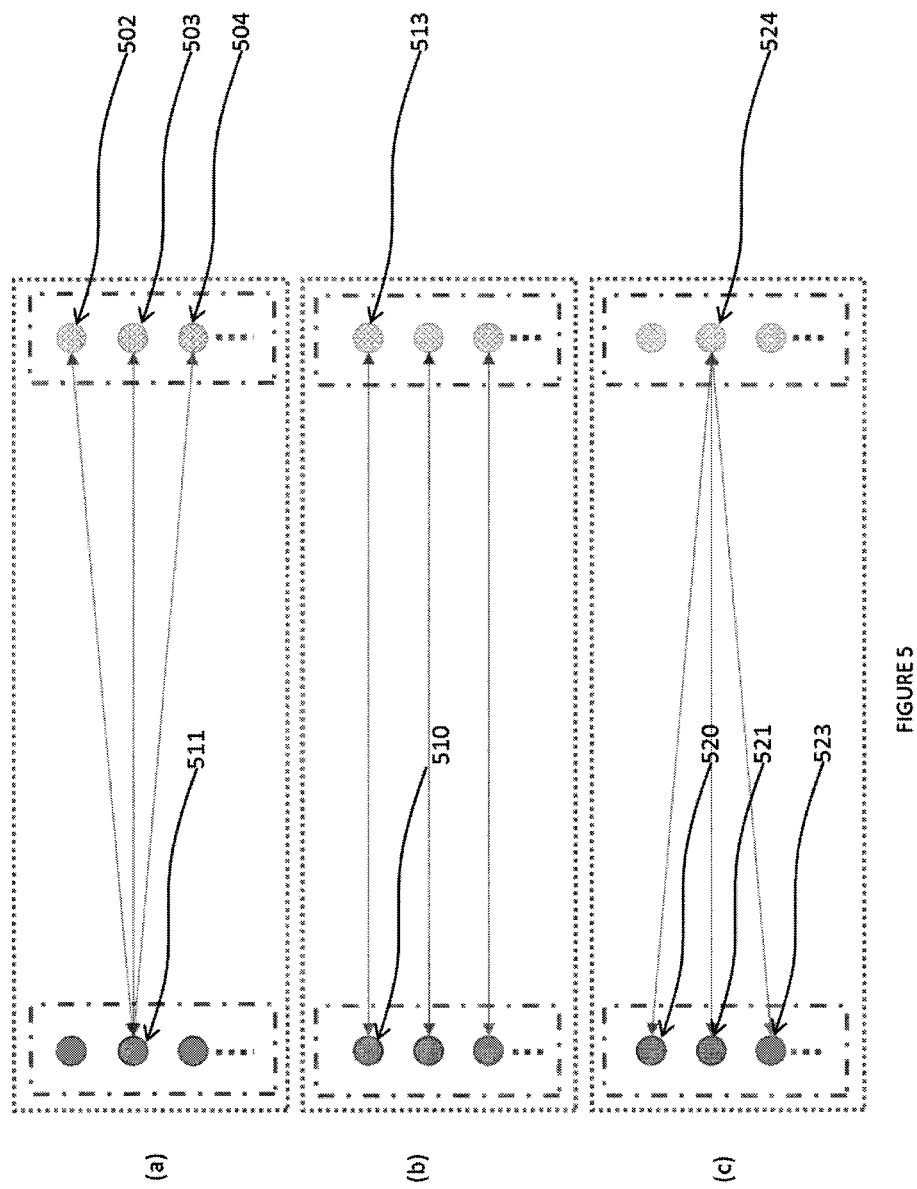
FIG. 5 shows a schematic drawing illustrating a number of generation and consumption allocation pairings wherein (a) is a pairing of meter identifications of one generator to many consumers, (b) is a one to one pairing of meter identifications, and (c) is a pairing of meter identifications of many generators to one consumer, according to an example embodiment.

Allocation pairings among generation meters and electrical load meters may come through a variety of modes, as presented in FIG. 5. Individual meters as generation 511 are represented by solid grey circles, while individual meters as electrical loads 521 are represented by hashed circles. FIG. 5 (*a*) illustrates an allocation pairing wherein one generation facility meter 511 is paired with multiple different electrical load consumer meters 502, 503, 504. Accordingly, a generation time series of the generation facility meter 511 is paired with electrical load consumer meters 502, 503, and 504 such that proportional allocation time series for the consumer load can be defined. FIG. 5 (*b*) illustrates allocation pairings wherein one generation facility meter e.g. 510 is paired with one electrical load consumer meter e.g. 513. FIG. 5 (*c*) illustrates an allocation pairing wherein multiple generation facility meters 520, 521, 523 are paired with one electrical load consumer meter 524. From such meter pairings, unique Anonymous Pairing ID's are created such that certificates may be established on the real time information flows derived from electrical generation and consumption as on the electrical mains power grid network.

Figure 6:
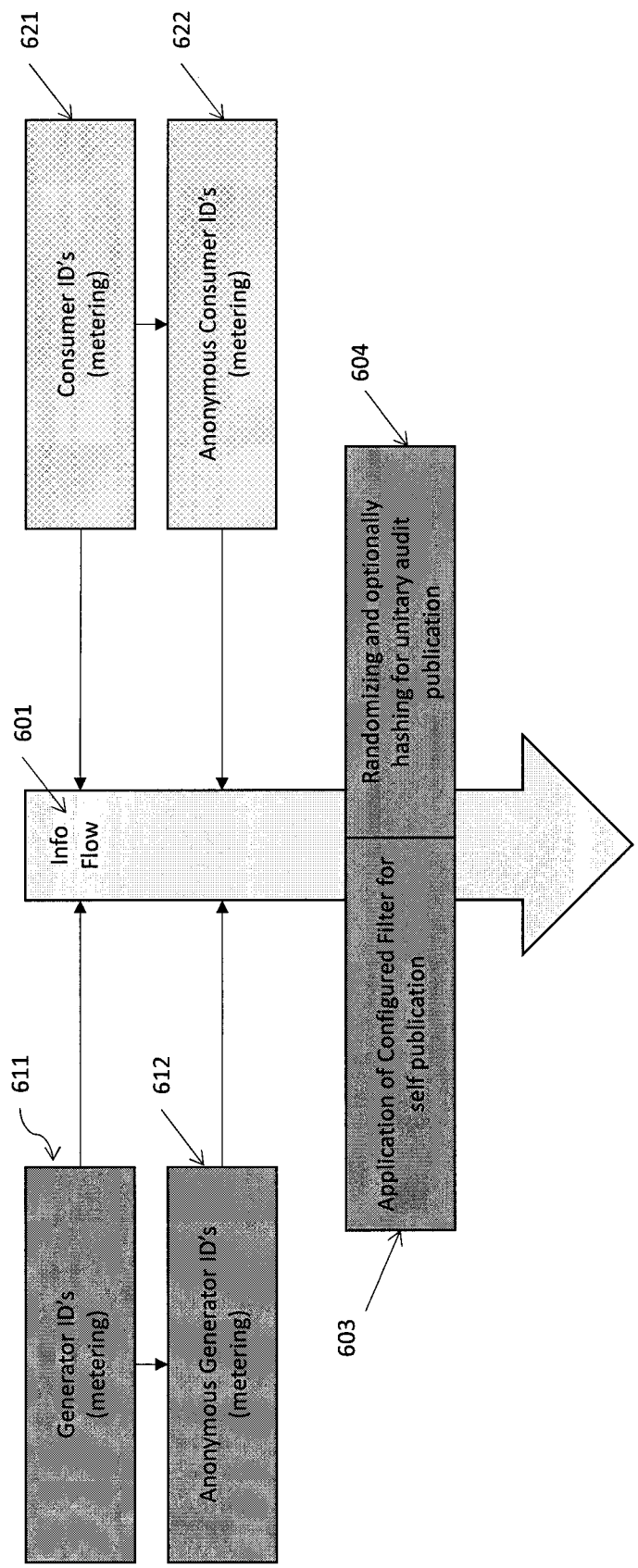
FIG. 6 shows a schematic drawing illustrating the real time flow of information both from generation meters and consumer meters as well as associated anonymous identifications of associated meters, wherein the information from said meters flows through a filtering system prepared by information obtained from user inputs and/or system defined and is ultimately published in a processed state, according to an example embodiment.

FIG. 6 shows a schematic drawing illustrating the real time flow of information both from generation meters and consumer meters as well as associated anonymous identifications of associated meters, wherein the information from said meters flows through a filtering system prepared by information obtained from user inputs and is ultimately published in a processed state, according to an example embodiment. Electrical flows as recorded become associated with a system of anonymous identifications provided such that information of the database may be made secure while publication from the database occurs. The database is structured to index energy flow data 601 with respect to time, and as such, cross-correlation information among energy meters at the generators with Generator IDs 611 and electrical loads with Consumer IDs 621 may be computed and in real time, based on allocation pairings. Anonymous identifications may be created using e.g. a random number system to create a unique identification that can mask any information that is correlated to the Generator IDs 611 or Consumer IDs 621. Advantageously within the secure server, the database can safely maintain an index which matches Generator IDs 611 to their Anonymous Generator IDs counterparts 612, and the database can safely maintain an index which matches Consumer IDs 621 to their Anonymous Consumer IDs counterparts 622. For added flexibility, the anonymous IDs can also be generated independently for each audit event and disposed of time to time, which allows for the anonymous IDs to be disposed of after an independent audit event has been published. The information associated with the allocation pairings is filtered at processing steps 603 and or 604 which have been configured to establish various forms of publication in example embodiments, here for self-publication and Unitary Audit publication respectively.

Figure 7:
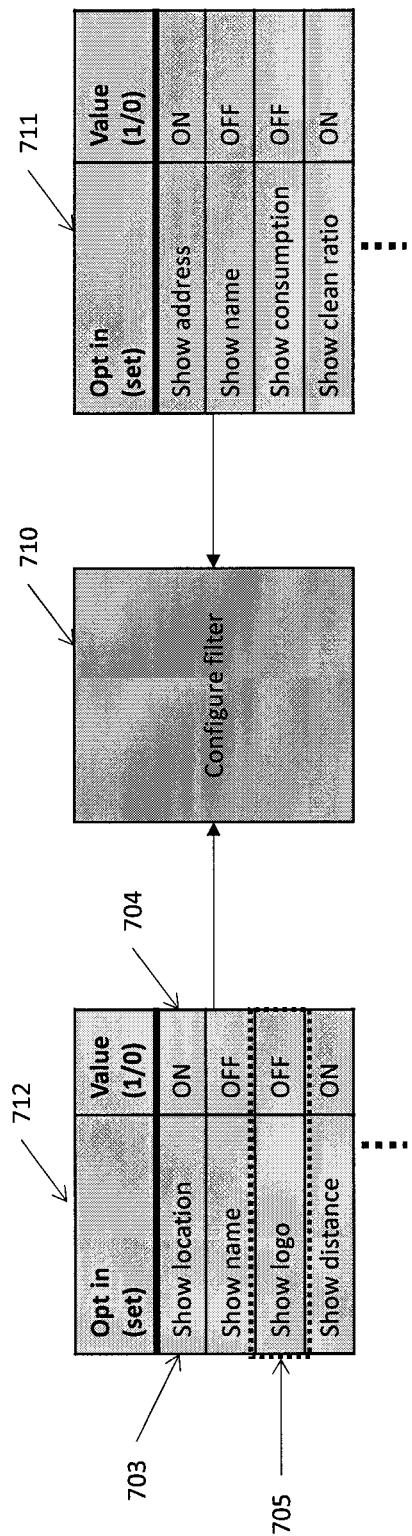
FIG. 7 shows a schematic drawing illustrating a system for obtaining user information where various meaningful user settings are configured as associated with energy flow information measured on energy generation or load meters, according to example embodiments.

In FIG. 7, a representation of user options 712 for generation associated data and user options 711 for consumer load associated data are shown for configuring a filter 710, according to an example embodiment. The filter 710 is a processor which derives self-publication data from the database readings (compare numeral 603 described above with reference to FIG. 6). User options 712 show how the filter 710 is configured such that a binary value such as the "on" position at 704 associates with an option such as the "Show ID" option 703. Accordingly, various options can be provided to a user such that they can configure their account and provide tailored presentations of audit information. It is noted that in the event that all of the values are set to "off", the "Unitary Audit" is still published (compare numeral 604) in example embodiments to advantageously meet certification requirements, as will be described in more detail below with reference to FIG. 8. In the Unitary Audit publication, the majority of information is made confidential and/or is hashed. The filter 710 may be configured, in an example embodiment, also by utilizing only user options 712 for generation associated data or only user options 711 for consumer load associated data, as the case may be. In such a setting, only one of the desired associated data sets and self-publication procedures may be provided, and the filter is configured such that it may provide the self-publication without obtaining/revealing information from a respective other portion of a meter pairing, as the case may be. As an additional provision, the system may also incorporate other user options in respect of various publication audiences. For example, instead of assuming the user opts-in to provide data to the public at large, the user may be provided with options of publishing data to only the users in association with a particular meter pairing, or only to a selected audience such as those individuals within their city/their identified proximity of a contiguous power grid network, or users who have signed on to access a particular private sharing community online.

Accordingly, users can advantageously provide inputs to e.g. a user log in account that identifies which information a particular user can make public. For example, the user may choose whether or not to disclose their address, their generation data, their consumption data, their total energy usage, their couplings or other material factors in associating with the certification of the energy transaction. Importantly, the users together can express their settings in respect of their mutual energy transaction certification. A rooftop solar account would tailor their account to present, say, their business identification and the logo of their business, while the electrical load user of the associate meter coupling may tailor their account to present, say, their business identification and the logo of their business. As such, a transactional certification may correctly identify the user identities by their registered names and can present the image of the businesses logos as being a part of each end of an energy transaction (as generation and consumption). Additional information can be provided by the users if they wish.

On the other hand, even if one, more or all users wish to remain unidentified, the Unitary Audit will still be published in such a way that all users remain anonymous while the total set of generation as read through energy meters, or as read through allocations in representation of transactional certificates, on a whole can still be audited such that no "double selling" of energy credits/allocation is provided.

Figure 8:
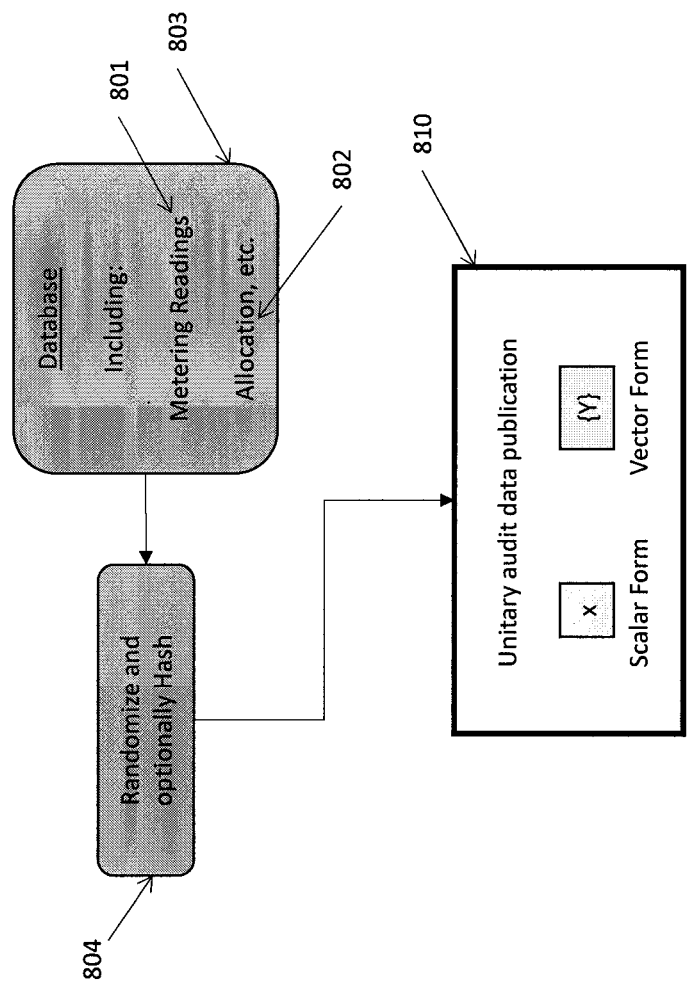
FIG. 8 shows a schematic drawing illustrating a system for auditing wherein associated information settings are established as a standard and, assuming no user settings are set as "on", a standard procedure of randomizing and optionally hashing generation meter and load meter pairings results in the publication of a unitized audit or certificate, according to an example embodiment.

FIG. 8 shows a schematic drawing illustrating a system for auditing wherein associated information settings are established as a standard and a standard procedure of randomizing and optionally hashing generation meter and load meter information, or of their pairings, results in the publication of publication data in the form of a Unitary Audit or certificate, according to an example embodiment. This Unitary Audit is configured to establish a very basic characteristic over all associated meter pairings, without revealing additional associated information of the various elements of a transactional certification. Meter readings 801 with their allocation information 802 are drawn from database 803, and an anonymous ID (refer to FIG. 6 and corresponding description above) is generated for each generator or consumer meter 801 at a process 804 configured to hide the identity of the user. These anonymous ID tags in an example embodiment are generated such that no correlation from the new ID can be made to the generation or consumer ID of the meter and their associated information which is to be protected and secured, at the discretion of the user(s). In such a Unitary Audit 810, each and every meter pairing allocation (as associated with the various modes from which meter pairings may be made, for example as described above with reference to FIG. 5) is audited and published in a unitary form and with anonymous identifications. The Unitary Audit 810 can be generated using various additional randomization and hashing algorithms, example embodiments of which are described below with reference to FIGS. 10 and 11. It is noted that the Unitary Audit 810 may take different forms, for example expressed in FIG. 8 as "scalar form" for audits in which one or more "aggregate" indications may be represented, such as a binary "Yes" or "No" in relation to generated energy being equal to or more than allocated/consumed energy, or as "vector form" for audits in which indications of (anonymous) transactional information are presented. In utilizing such a system, the algorithm utilized for optionally hashing and randomizing information is provided to the auditor such that the result of the vector or scalar Unitary Audit may be interpreted to be accurate in respect of the stated algorithm used deriving the Unitary Audit, while the raw data is protected from being publically revealed.

Figure 9:
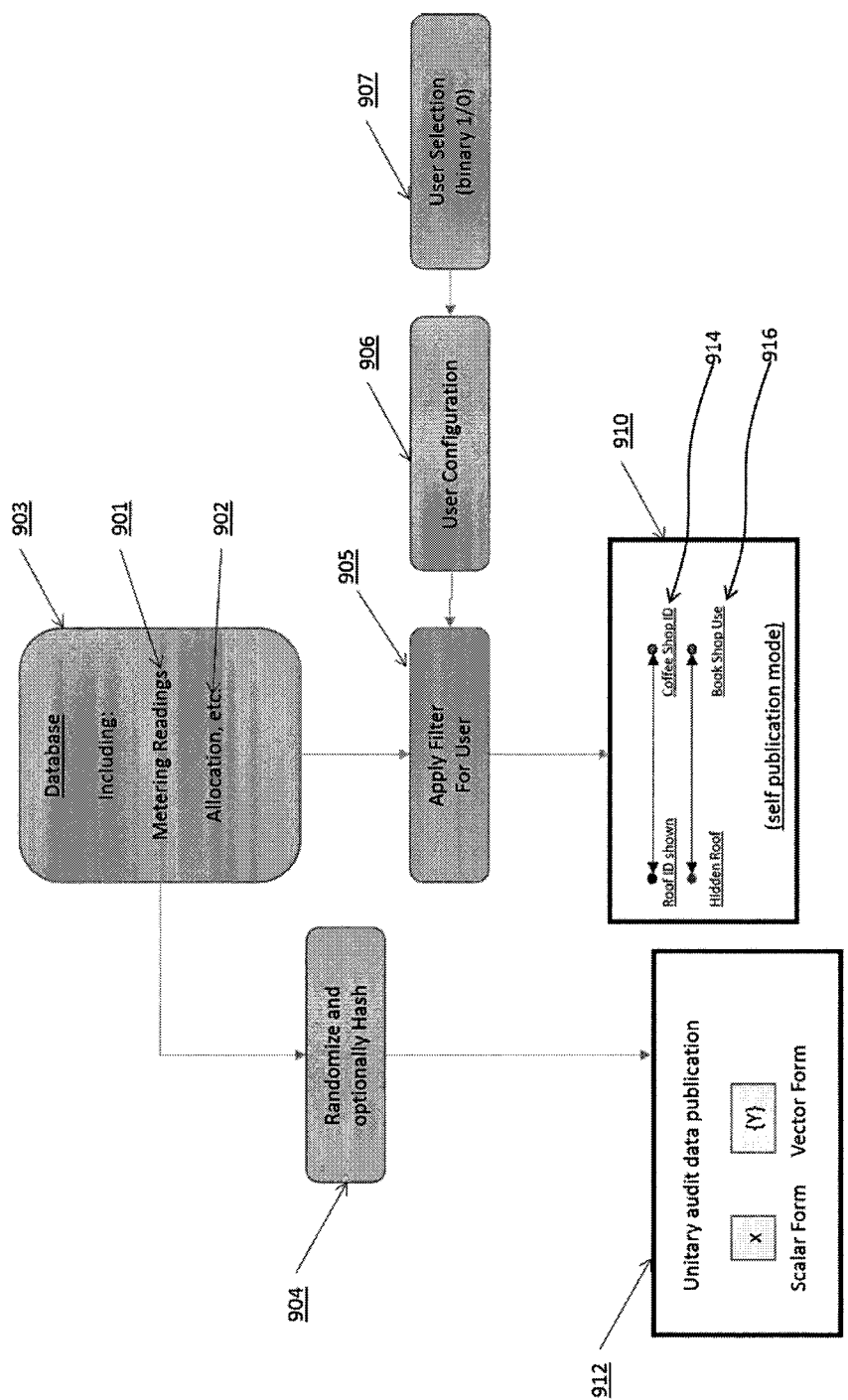
FIG. 9 shows a schematic drawing illustrating a system for auditing energy transactions wherein associated information settings are established as a standard, and in addition, to a standard procedure of hashing and randomizing anonymous generation meter and load meter pairings, resulting in the publication of a unitary audit or certificate. Subsets of information of the databases are published such that additional information is presented based on user settings for self-publication, according to an example embodiment.

As shown in FIG. 9, in an example embodiment, in addition to the Unitary Audit publication (compare numerals 904 and 912, which correspond to numerals 804 and 810 described above with reference to FIG. 8), publication of publication data can be provided in a self-publication mode 910. Meter readings 901 with their allocation information 902 are drawn from database 903, and a filter is applied 905 for individual users. The filter is user configured 906 based on user selection 907, for example binary selection as described above with reference to FIG. 7, resulting in self-publication of user specific information in the self-publication mode 910, here in a vector form in an example embodiment. For example, where both users involved in an allocation pairing have agreed to self-publish information, a specific transactional allocation or certificate can be self-published, compare numeral 914. On the other hand, if only one of the users of an allocation pairing has agreed to self-publish information, for example a consumer end transactional allocation or certificate can be published in which the generator identity of e.g. a solar rooftop generator is hidden, compare 916. In utilizing such a system, the algorithm utilized for optionally hashing and randomizing information is provided to the auditor such that the result of the self-published information may be interpreted to be accurate in respect of the stated algorithm used to derive the self-publication, while the raw data is protected from being publically revealed.

Figure 12:
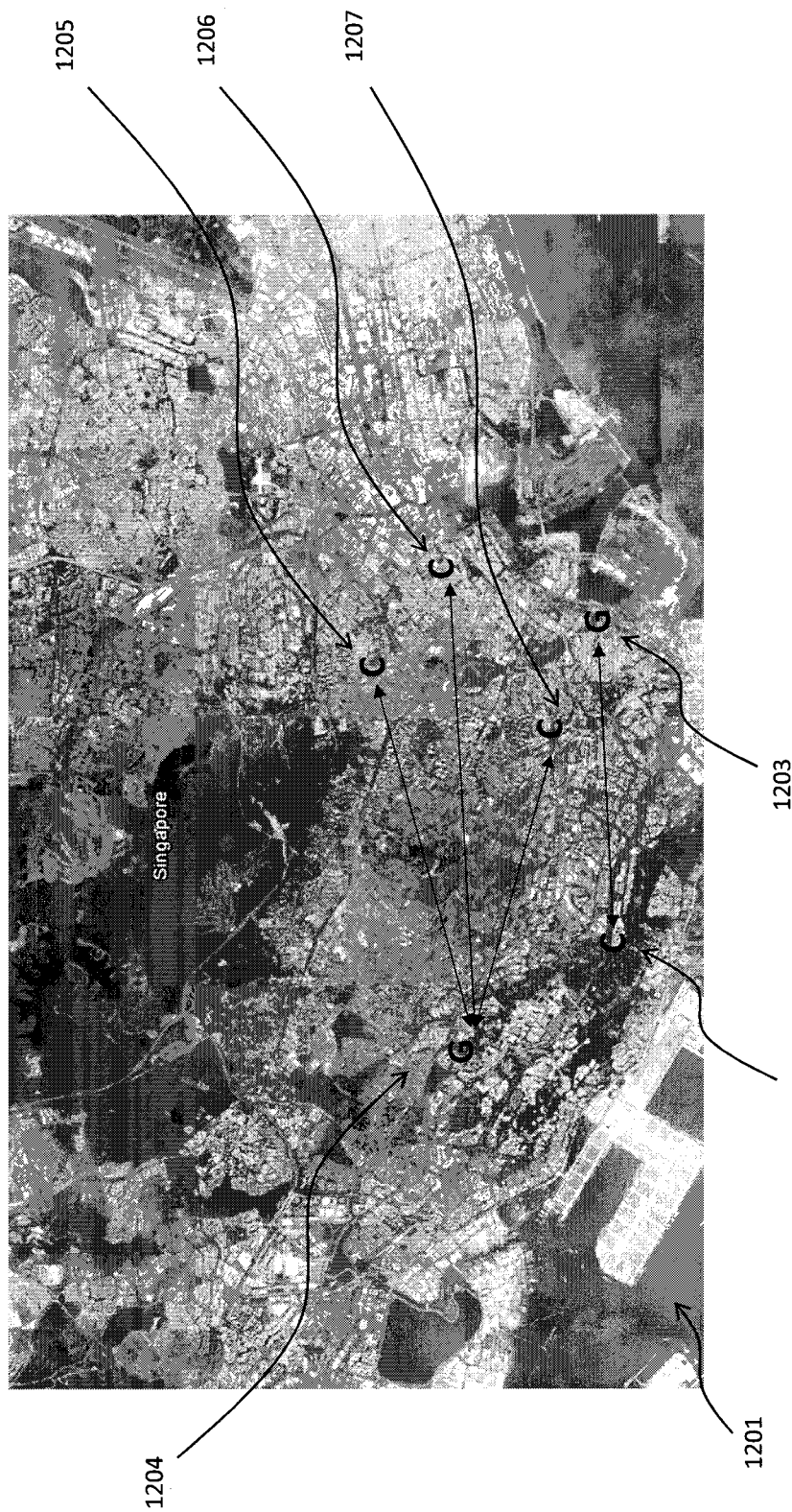
FIG. 12 shows a schematic illustration of a vector self-publication audit wherein users have enabled publication of the position of their energy meters among meter pairings, yet hidden their nominal energy meter readings data.

The provisions enabled to adapt for various self-publication audit forms allow for a rich variety of information to be publically presented. FIG. 12 shows an example of a self-publication form wherein users at both generator ("G") and consumer ("C") sides of a transaction have opted to allow for the latitude and longitude positions of their locations to be publically available. In this case, the real time nominal measurements of data read at the energy generation and energy consumption meters is private as the users have not opted to publish this information. In this scenario, an overlay onto a map can be provide by way of the self-publication mode in one embodiment, illustrating the respective ends of the transaction by the locations of the meter pairings. A map 1201 which may be rightfully obtained, for example Google maps (see https://maps.google.com) or Google Earth (see https://earth.google.com) maps which are offered for free to the public, may be utilized to obtain a corresponding image from which to compare latitude and longitude data of a meter pairing. In FIG. 12, an image overlay which is composed of connections representing meter pairings accurately reproduces latitude and longitude data of a consumer 1202 paired to a generator 1203. Similarly, a generator 1204 is accurately reproduced as paired to three consumers 1205, 1206 and 1207 where the latitude and longitude of the generators and consumers are used to represent the visual information as a self-publication procedure. Advantageously, a software system accessing the server and the database is configured to prepare a visual layer which may be provided to be presented on a screen incorporating the freely accessible map as well, such that latitude and longitude of the consumer/generator associations and the map are illustrated in a single visual image which may be displayed on a computer monitor.

Figure 10:
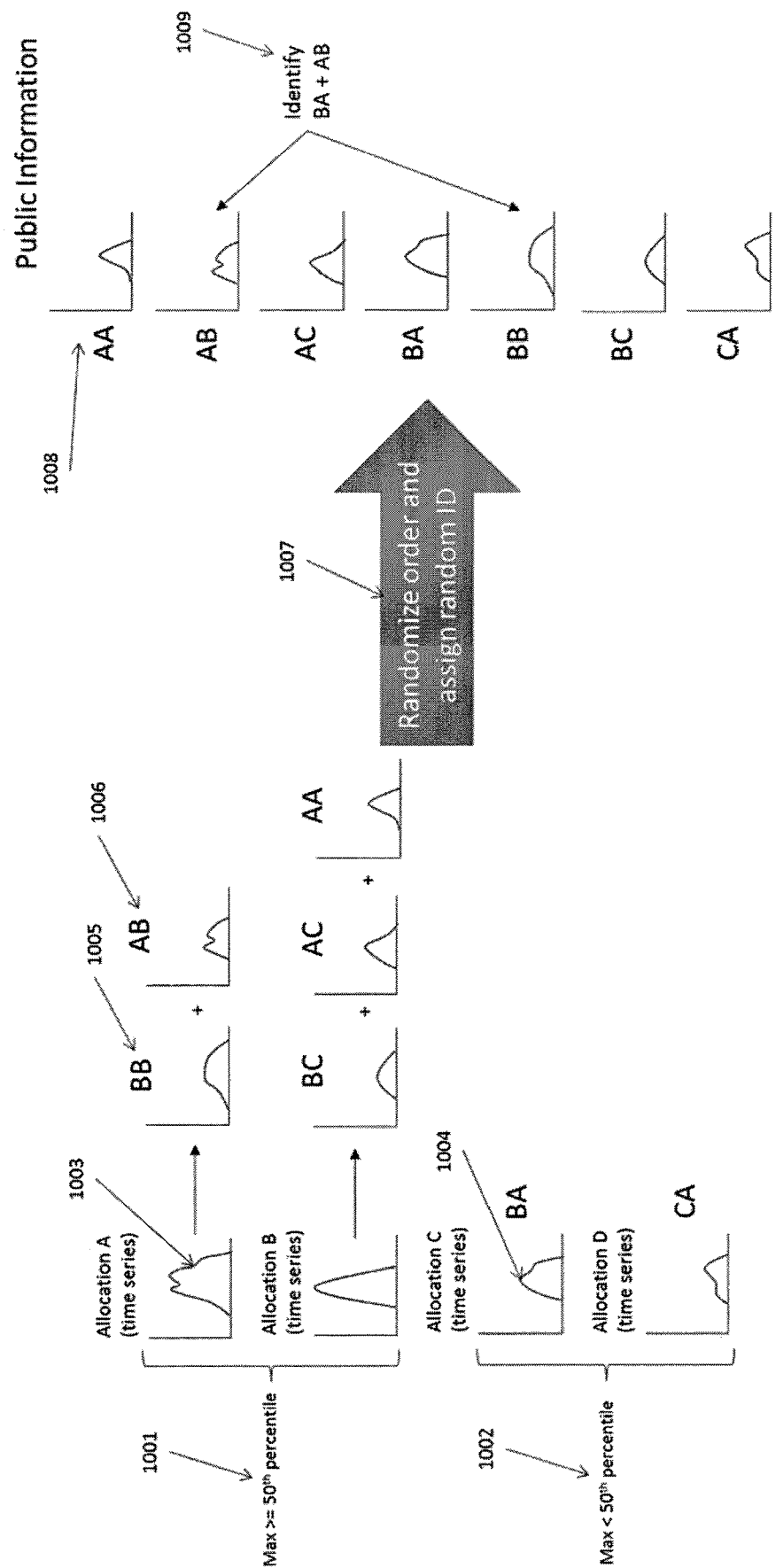
FIG. 10 shows a schematic drawing illustrating a specific implementation example for hiding a customer's clean energy consumption profile by splitting the allocation time series into multiple time series such that the aggregate of the generated multiple time series is equal to the original allocation time series being disguised, according to an example embodiment, which is useful e.g. to hide customers that are receiving a much larger amount of clean energy than most customers.

In FIG. 10, an example of a process providing an additional means to hide the identity of a consumer receiving clean energy is illustrated. As will be appreciated by a person skilled in the art, replacing the names of users (i.e. generators, consumers) with e.g. a random anonymous identifier as described for the Unitary Audit capability in an example embodiment above may still be vulnerable to indirect determination of a user's identity. For example, if an anonymous consumer receives a large load as represented in a Unitary Audit in vector form, e.g. indicating anonymous transactional pairing energy information and thus stands out from the other consumers, one could make the assumption which user that could be based on public observations from other correlating factors. In this situation, in an example embodiment the allocation is split into multiple allocations which resemble other allocations, which would hide it in the noise. In one such embodiment, all of the consumers' allocations are sorted by peak values and placed in the 'greater than or equal to $50^{th}$ percentile' (GTEP) 1001 or 'lower than $50^{th}$ percentile' (LTLP) 1002 lists. The largest peak value in the LTLP 1002 list may be stored as a mid-peak value 1004. Only allocations in the GTEP 1001 may be split into smaller allocations by replicating existing smaller allocations and subtracting those time series from the time series that is to be hidden. The process will continue while the remaining time series has a peak greater than the mid peak value 1004. All of the allocation curves, including the ones which add up to the initial allocation curve(s) that have been hidden are gathered and randomized and their identity replaced with a random ID, indicated at numeral 1007. The result can then be shown to the public 1008. The system may further be configured such that, if the information is accessed via a log in by a current user, those allocations that can be aggregated to equal the current user's allocation 1009 are specified.

Figure 11:
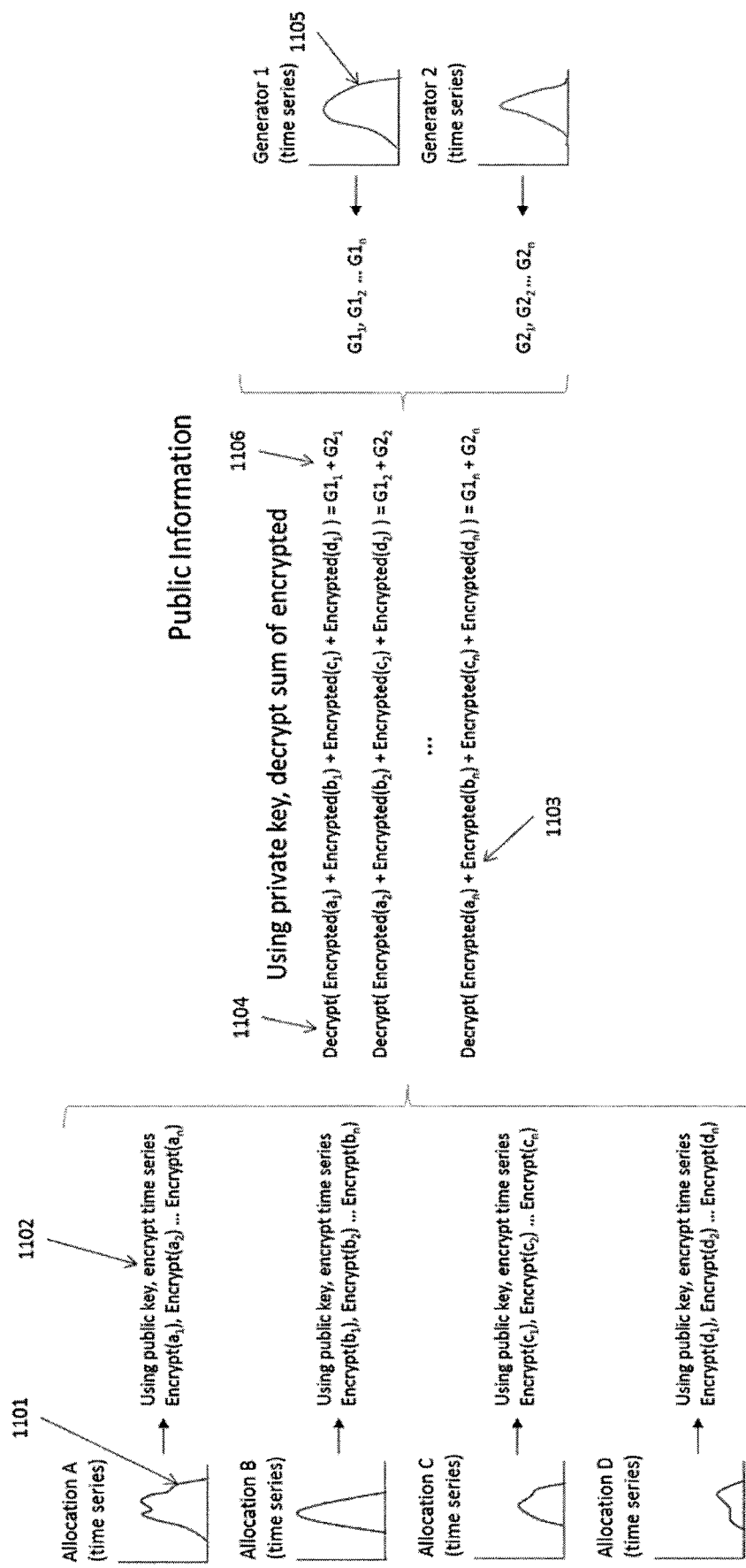
FIG. 11 shows a schematic drawing illustrating another specific implementation for hiding a customer's clean energy consumption profile by applying a Paillier Cryptosystem to encrypt the allocation time series. The encryption has a unique feature of supporting homomorphic addition while encrypted. Sensitive clean energy consumption can then remain encrypted and only the sum can be decrypted for auditing purposes, according to an example embodiment.

As illustrated in FIG. 11, a Paillier Cryptosystem is used in another example embodiment to hide the allocations from the public and only allow the public to decrypt the sum of the allocations for each generator without being able to see each allocation. Each time component of each consumer allocation e.g. 1101 time series is encrypted using each consumer's public key, indicated at numeral 1102. The corresponding components for a particular time/period can be summed while remaining encrypted, indicated e.g. at numeral 1103, and can be decrypted using a private key, indicated at numeral 1104. The system has a unique private key for each user, and preferably, a newly generated private key is utilised each time an audit is performed. On the other hand, the time components of each generator data e.g. 1105 time series, which are released to the public, can be summed and the sum of the generation data 1106 can be audited to be equal or greater than the decrypted sum of consumer allocations 1104 for each particular time period.

Figure 15:
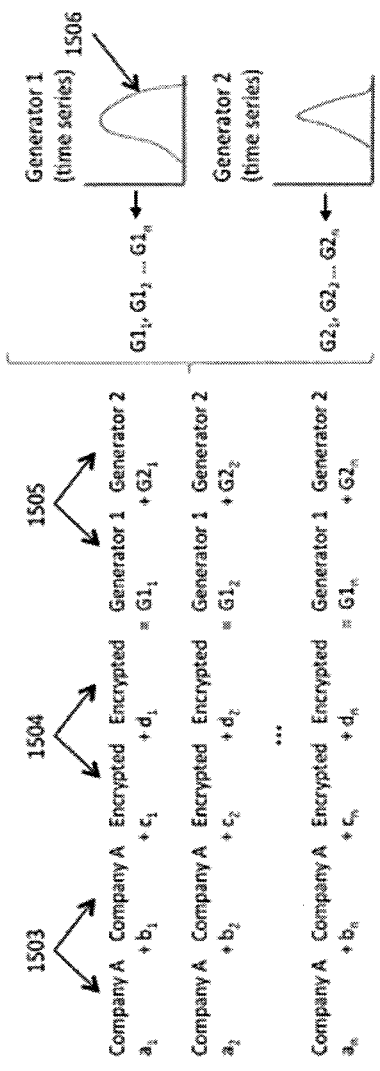
FIG. 15 shows a schematic illustration of an encryption scheme for certification of information involving transactions between generation and load consumption.
Figure 15:
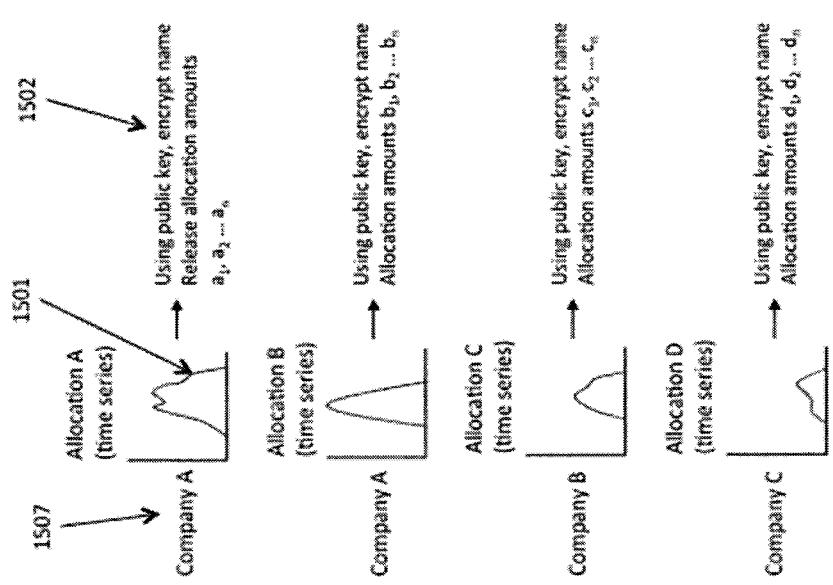

As illustrated in FIG. 15, another example embodiment is shown where the generation and allocation amount is released to the public while only encrypting the name associated with the allocation. Each time component of each consumer allocation amount e.g. 1501 is released to the public and the associated name 1507 is encrypted with the public key associated with the meter, as indicated at numeral 1502. The client personal computer that is viewing this data will attempt to decrypt all the names using the given keys, and will only be able to successfully decrypt the names that have been provided/associated with the user account logged in, as indicated at numeral 1503. Any names that could not be decrypted will remain encrypted 1504. On the other hand, the time components of each generator data e.g. 1506 time series, are released to the public, as indicated in numeral 1505. Advantageously, users can essentially see all the generation and allocation values and verify that no double supply has occurred, yet will not be able to obtain the associated name for any meters where the user did not receive a private key. An example method that can be used to encrypt would be to convert the names to a MIME64 format then encrypted with El Gamal using a non-deterministic method. This gives the encrypted value a random property where the same name will not encrypt to the same value. Public and private keys can be re-generated as often as desired since the keys get re-distributed to the clients on every audit.

From the description of the example embodiments above, it can be recognized that varieties of information processes tailored and configured from a filter or processing apparatus. In addition to system defined filtering for Unitary Audit publication, filtering for self-publication utilizing, for example, the binary results of the user selected options as illustrated in FIG. 7 may be used. Filtering for Unitary Audit publication can be generally determined from the randomization systems on the ID's of generation and consumption meters, for example as described with reference to FIGS. 1 and 2, preferably with additional hashing systems that are aimed at reducing vulnerability of information that is to be inaccessible from public publication, of being discovered/derived from the published information.

Forms of publication illustrating a system defined basic or unitary audit which advantageously maintains confidentiality of various information and associated information has been described, by way of example, with reference to FIG. 8, while a tailored self-publication mode that allows for user selected information publications has been described, by way of example, with reference to FIG. 9. Preferably, providing relevant certification authorities with the details of the processing algorithm for the system defined audit can "prove" the confidentiality and accuracy of the facilitated audit, thus providing confidence in implementing a certification platform according to example embodiments.

The Unitary Audit in example embodiments consists of verifying that the sum of all of the energy generated is equal or greater than the sum of energy allocated for each customer. This statement confirms that there was not more energy allocated than was produced. The statement can advantageously be verified/certified for each time interval which may be set by the energy market as the settlement interval or by the system itself.

There are two types of information that typically need to be released to the public to provide an audit of the allocation of energy in example embodiments:

a) The output of energy from each generation unit
b) The total energy allocated for all users The output of energy generated can typically be released publicly, whereas each customer might decide not to release their clean energy consumption. For example, releasing each user's allocated energy could lead to knowing how much energy a customer is consuming at its peak. Hiding the customer names from each allocation in the published information would, for example, still lead to noticeable high allocation loads that could be correlated to customers that are known to have higher consumption loads. Measures such as those described by way of example, with reference to FIG. 10 and FIG. 11 can preferably be used to hide noticeable allocations while providing transparency in showing the total energy generated and in showing that no "double selling" of generated energy from intermittent or "green" sources took place. It is noted, however, that the present invention is not limited to publishing of information related to intermittent or "green" sources, but can be applied broadly to any form and mixture of generation technologies to, for example, audit the mixture of energy from different sources across the power grid as a whole, or transactional pairings of generators and consumer loads.

While advantageously providing a transparent system for certification, the described embodiments further advantageously provide users with options to control whether or not to disclose certain information to the public, for example as described with reference to FIGS. 7 and 8.

Figure 16:
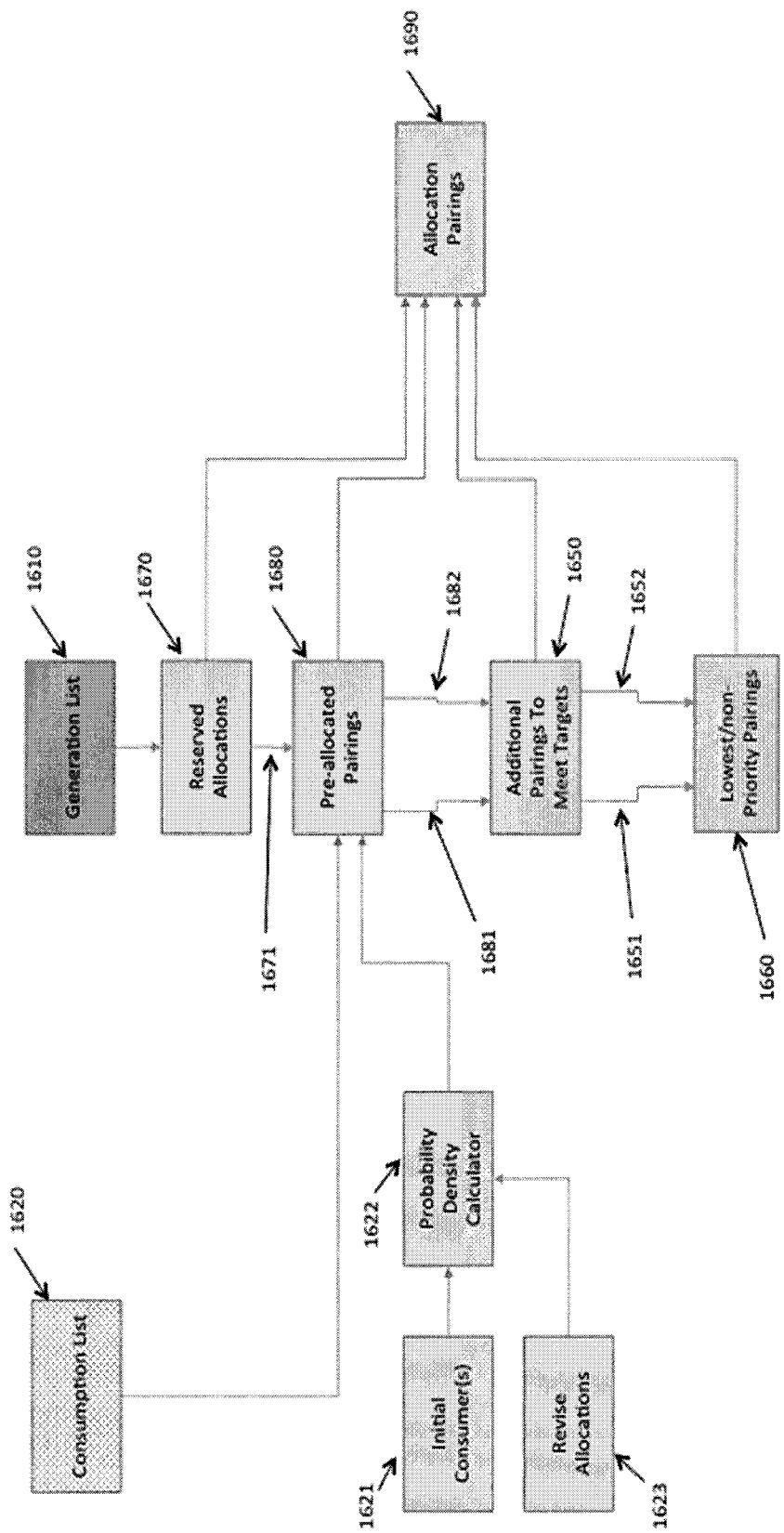
FIG. 16 shows a schematic drawing illustrating a procedure, process, or method from which meter allocation pairings are established and prioritized to be stored for a database, according to an example embodiment.

FIG. 16 shows a schematic drawing illustrating a procedure, process, or method, for implementation on an apparatus, from which meter allocation pairings are established to be stored for a database (compare 100 in FIG. 1, 200 in FIG. 2), according to an example embodiment. A generation list 1610, a consumption list 1620, and pre-allocated pairings 1680 are gathered from the database (for example from database 200, FIG. 2, or database 100, FIG. 1). The entire process in FIG. 16 demonstrates how to build a series of allocations pairings 1690 from the generation list 1610 and consumption list 1620 through a series of different priority levels (1770, 1680, 1650, 1660), where each level generates allocation pairings and removes the amount allocated from the respective consumption and generation lists and moves them to the next lower priority level, according to an example embodiment.

In this embodiment, the first allocation pairings made are from the reserved allocations 1670 where customers can reserve partial or entire generators to them. Alternatively, the system can reserve allocations according to criteria established by a computational logic system coupled with the information system, rather than the consumers themselves, as described further below. The allocations made are removed from the generation list 1610 and the result 1671 is sent to the next process, pre-allocated pairings 1680. Reserved Allocations 1670 are performed such that they can be provided independent of a respective load. For example, a fraction or all of a generator meter can be reserved to a particular consumer and the power associated with this reserved capacity would be provided to this consumer irrespective of the actual consumption of the consumer load. Power which has been reserved will not enter into the next level of priority to consumer loads. Optionally, the consumer can elect to have a reserved load meter associated with a generator meter for auditing and publishing. In his case additional consumer lists can be added in the data base.

The probability density calculator 1622 generates proposed allocation pairs that are either generated from being an initial consumer 1621 or revised to meet new needs or adjusted to weather changes such as seasonal for intermittent sources, or adjusted to control changes for dispatchable sources, as indicated at numeral 1623. Calculations can use a probability density calculator 1622 based on, for example, historical data for generation and/or consumption to attempt to predict the generation needed to meet the consumer's needs and build and/or revise the pre-allocated pairings 1680. Details of a suitable probability density calculator are described, for example, in WO 2016/064341. Advantageously, such an embodiments of allocation allows priorities of access to multiple energy generation resources to be provided for, and various mixes of energy sources to be subscribed to for supply to consumer loads prior to the supply dates by using a predictive forecasting module.

In the pre-allocated pairings 1680 process, consumption from consumption list 1620 is correlated with the unallocated generation 1671 using the proposed allocation pairs from the probability density calculator 1622 and allocation pairings built that are limited to each consumer's consumption. These allocations are sent to the allocations pairings module 1690 and subtracted from the generation and consumption as 1681 and 1682 respectively and sent to the additional pairings process 1650 to meet targets. Using the new generation list 1681 and new consumption list 1682, the additional pairings to meet targets 1650 will create new pairings to help each customer reach their designated targets and create more sets of allocations 1690 and remove the new allocations from the generation 1651 and from the consumption 1652 and sent to the non-priority pairings process 1660. This last process 1660 will take the unallocated generation 1651 and divide it up amongst all the consumers based on their remaining consumption 1652 that was not allocated. These new allocation pairs are sent to the allocation pairings module 1690.

Implemented within the system according to an example embodiment are statistical calculators which observe time series events from both generator metering information (obtained from real generation data, or from simulated generation data) and load consumption metering information (obtained from real consumption data, or from simulated consumption data). A correlation value, such as an $R^2$ value, is obtained through a variety of subsets of the information. Higher correlation values, in an example embodiment, are utilized to identify optimized matched meter pairings between generators and loads. As such, the system can also be implemented so as to recommend various generation to load pairings for consumers instead of establishing the paired metering allocations based on only the consumer selected values. Advantageously, such a system can be implemented also to assist consumers to utilize power when the availability of the paired resources is raised and thus provides for greater correlation of power supply through a network according to the consumption load demand. Such a system may in addition implement locational information of the generator and load pairs reflecting the total power network transmission line loss and tension. Through this function, power networks can accommodate for correlated pairings and associated current flows between various collection and consumption electronic devices scattered across the power network.

Figure 13:
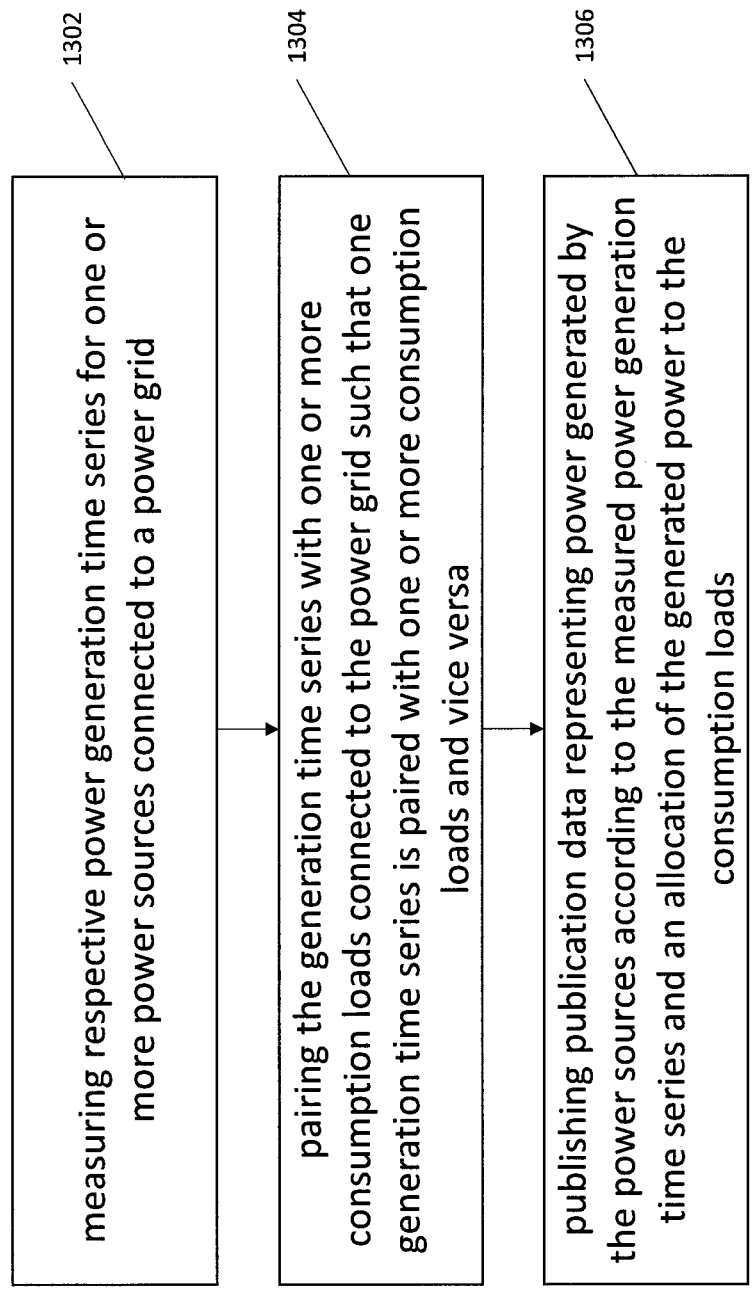
FIG. 13 shows a flow chart illustrating a method of facilitating auditing of power generation and allocation thereof to consumption loads, according to an example embodiment.

FIG. 13 shows a flowchart illustrating a method of facilitating auditing of power generation and allocation thereof to consumption loads, according to an example embodiment. At step 1302, respective power generation time series for one or more power sources connected to a power grid are determined. At step 1304, the generation time series is paired with one or more consumption loads connected to the power grid such that one generation time series is paired with one or more consumption loads and vice versa. At step 1306, publication data representing power generated by the power sources according to the measured power generation time series and an allocation of the generated power to the consumption loads is published.

The method may further comprise generating respective power allocation time series for the one or more consumption loads based on the measured power generation time series.

The method may further comprise determining respective power consumption time series for the one or more consumption loads, wherein determining the respective power consumption time series may comprise measuring the respective power consumption time series and/or statistically simulating the respective power consumption time series. The allocation of the generated power to the consumption loads may be based on the determined power consumption time series.

The method may further comprise generating the publication data. Generating the publication data may comprise applying a filter to at least data representing the allocation of the generated power to the consumption loads. The filter may comprise a pre-set filter element and/or a user-definable filter element. The pre-set filter element may be configured to generate the publication data in the form of unitary audit data. The user-definable filter element may be configured to generate the publication data in the form of self-publication data. The pre-set filter element may be configured to apply a randomization processing to hide identities of respective users associated with the power sources and the consumption loads. The pre-set filter element may be configured to apply a hashing processing to at least the data representing allocation of the generated power to the consumption loads. The hashing processing may comprise dividing an allocation time series associated with a consumption load into a plurality of publication time series such that the sum of the plurality of publication time series equals the allocation time series, and wherein the publication data includes data representing the respective publication time series. The hashing processing may comprise decomposing an allocation time series associated with a consumption load into its time components, encrypting each time component using a public key associated with the consumption load, and wherein the publication data includes a sum of corresponding encrypted time elements from respective allocation time series.

The pairing of the generation time series with the one or more consumption loads may comprise applying and/or modifying pre-set pairings. The pairing of the generation time series with the one or more consumption loads may comprise determining an unallocated portion of the power generated by the power sources based on the pre-set pairings, and generating additional pairings based on the unallocated portion.

The pairing may be based on consumer specified quantities, and/or may be based on a system calculating correlation coefficients among the power generation time series and power consumption time series.

The determining the respective power generation time series may comprise measuring the respective power generation time series and/or statistically simulating the respective power generation time series.

Figure 14:
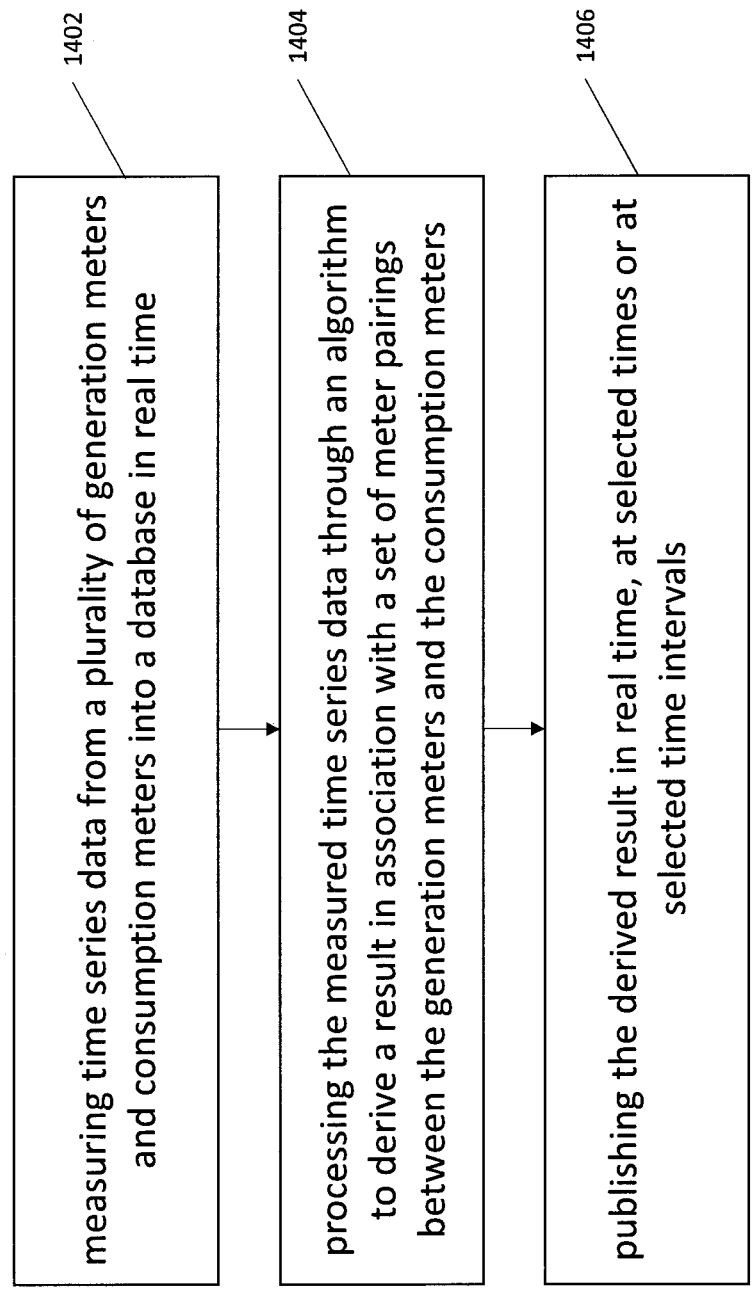
FIG. 14 shows a flowchart illustrating a method of certifying generation and consumption transactional pairings over a contiguous power grid network, according to an example embodiment.

FIG. 14 shows a flowchart illustrating a method of certifying generation and consumption transactional pairings over a contiguous power grid network, according to an example embodiment. At step 1402, time series data from a plurality of generation meters and consumption meters into a database in real time is measured. At step 1404, the measured time series data is processed through an algorithm to derive a result in association with a set of meter pairings between the generation meters and the consumption meters. At step 1406, the derived result is published in real time, at selected times or at selected time intervals.

The method may further comprise publishing the algorithm to the public.

The algorithm may be configured by obtaining user settings from users associated with the generation meters and the consumption meters.

In one embodiment, a system for facilitating auditing of power generation and allocation thereof to consumption loads is provided, comprising means for determining respective power generation time series for one or more power sources connected to a power grid; a processor for pairing the generation time series with one or more consumption loads connected to the power grid such that one generation time series is paired with one or more consumption loads and vice versa; and a publication platform for publishing publication data representing power generated by the power sources according to the measured power generation time series and an allocation of the generated power to the consumption loads.

The system may further comprise the processor generating respective power allocation time series for the one or more consumption loads based on the measured power generation time series.

The system may further comprise means for determining respective power consumption time series for the one or more consumption loads, wherein determining the respective power consumption time series may comprise measuring the respective power consumption time series and/or statistically simulating the respective power consumption time series. The allocation of the generated power to the consumption loads may be based on the determined power consumption time series.

The processor may further be configured for generating the publication data. Generating the publication data may comprise applying a filter to at least data representing the allocation of the generated power to the consumption loads. The filter may comprise a pre-set filter element and/or a user-definable filter element. The pre-set filter element may be configured to generate the publication data in the form of unitary audit data. The user-definable filter element may be configured to generate the publication data in the form of self-publication data. The pre-set filter element may be configured to apply a randomization processing to hide identities of respective users associated with the power sources and the consumption loads. The pre-set filter element may be configured to apply a hashing processing to at least the data representing allocation of the generated power to the consumption loads. The hashing processing may comprise dividing an allocation time series associated with a consumption load into a plurality of publication time series such that the sum of the plurality of publication time series equals the allocation time series, and wherein the publication data includes data representing the respective publication time series. The hashing processing may comprise decomposing an allocation time series associated with a consumption load into its time components, encrypting each time component using a public key associated with the consumption load, and wherein the publication data includes a sum of corresponding encrypted time elements from respective allocation time series.

The pairing of the generation time series with the one or more consumption loads may comprise applying and/or modifying pre-set pairings. The pairing of the generation time series with the one or more consumption loads may comprise determining an unallocated portion of the power generated by the power sources based on the pre-set pairings, and generating additional pairings based on the unallocated portion.

The processor for pairing may be configured to base the pairing on consumer specified quantities, and/or may be configured to calculate correlation coefficients among the power generation time series and power consumption time series.

The means for determining the respective power generation time series may be configured for measuring the respective power generation time series and/or statistically simulating the respective power generation time series.

In one embodiment, a system for certifying generation and consumption transactional pairings over a contiguous power grid network is provided, comprising a database; a plurality of generation meters and consumption meters configured for measuring time series data into the database in real time; a processor for processing the measured time series data through an algorithm to derive a result in association with a set of meter pairings between the generation meters and the consumption meters; and a publishing platform for publishing the derived result in real time, at selected times or at selected time intervals.

The system may further comprise a publishing platform for publishing the algorithm to the public.

The algorithm may be configured by obtaining user settings from users associated with the generation meters and the consumption meters.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features, in particular any combination of features in the patent claims, even if the feature or combination of features is not explicitly specified in the patent claims or the present embodiments.

The invention claimed is:

1. A method of facilitating auditing of power generation and allocation thereof to consumption loads, comprising:
   determining respective power generation time series for one or more power sources connected to a power grid;
   pairing the generation time series with one or more consumption loads connected to the power grid such that one generation time series is paired with one or more consumption loads and vice versa;
   generating publication data representing power generated by the power sources according to a measured power generation time series and an allocation of the generated power to the consumption loads; and
   publishing the publication data.

2. The method of claim 1, further comprising generating respective power allocation time series for the one or more consumption loads based on the measured power generation time series.

3. The method of claim 1, further comprising determining respective power consumption time series for the one or more consumption loads, wherein determining the respective power consumption time series comprises at least one of measuring the respective power consumption time series or statistically simulating the respective power consumption time series, wherein the allocation of the generated power to the consumption loads is based on the determined power consumption time series.

4. The method of claim 1, wherein generating the publication data comprises applying a filter to at least data representing the allocation of the generated power to the consumption loads, wherein the filter comprises at least one of a pre-set filter element or a user-definable filter element, and wherein the pre-set filter element is configured to generate the publication data in the form of unitary audit data, the user-definable filter element is configured to generate the publication data in the form of self-publication data, the pre-set filter element is configured to apply a randomization processing to hide identities of respective users associated with the power sources and the consumption loads, or the pre-set filter element is configured to apply a hashing processing to at least the data representing allocation of the generated power to the consumption loads.

5. The method of claim 4, wherein the pre-set filter element is configured to apply a hashing processing to at least the data representing allocation of the generated power to the consumption loads.

6. The method of claim 5, wherein the hashing processing comprises dividing an allocation time series associated with a consumption load into a plurality of publication time series such that the sum of the plurality of publication time series equals the allocation time series, wherein the publication data includes data representing the respective publication time series and the hashing processing comprises decomposing an allocation time series associated with a consumption load into its time components and encrypting each time component using a public key associated with the consumption load, and wherein the publication data includes a sum of corresponding encrypted time elements from respective allocation time series.

7. The method of claim 1, wherein the pairing of the generation time series with the one or more consumption loads comprises at least one of applying or modifying pre-set pairings, wherein the pairing of the generation time series with the one or more consumption loads comprises at least one of determining an unallocated portion of the power generated by the power sources based on the pre-set pairings or generating additional pairings based on the unallocated portion, wherein the at least one of applying or modifying pre-set pairings comprises applying different priority level allocation processes in order of descending priority, and the priority level allocation processes comprise two or more of a reserved allocations process, a dedicated allocations process based on a forecaster, an allocations process for meeting targets for products according to decreasing priority, and an allocations process to non-priority products.

8. The method of claim 1, wherein the pairing is based on at least one of consumer specified quantities or a system calculating correlation coefficients among the power generation time series and power consumption time series.

9. The method of claim 1; wherein the determining the respective power generation time series comprises at least one of measuring the respective power generation time series or statistically simulating the respective power generation time series.

10. A system for facilitating auditing of power generation and allocation thereof to consumption loads, comprising:
   means for determining respective power generation time series for one or more power sources connected to a power grid;
   a processor that pairs the generation time series with one or more consumption loads connected to the power grid such that one generation time series is paired with one or more consumption loads and vice versa and that generates publication data representing power generated by the power sources according to a measured power generation time series and an allocation of the generated power to the consumption loads; and
   a publication platform for publishing the publication data.

11. The system of claim 10, further comprising the processor generating respective power allocation time series for the one or more consumption loads based on the measured power generation time series.

12. The system of claim 10, further comprising means for determining respective power consumption time series for the one or more consumption loads, wherein determining the respective power consumption time series comprises at least one of measuring the respective power consumption time series or statistically simulating the respective power consumption time series, and wherein the allocation of the generated power to the consumption loads is based on the determined power consumption time series.

13. The system of claim 10, wherein generating the publication data comprises applying a filter to at least data representing the allocation of the generated power to the consumption loads, wherein the filter comprises at least one of a pre-set filter element or a user-definable filter element, and wherein the pre-set filter element is configured to generate the publication data in the form of unitary audit data, the user-definable filter element is configured to generate the publication data in the form of self-publication data, the user-definable filter element is configured to generate the publication data in the form of self-publication data, the pre-set filter element is configured to apply a randomization processing to hide identities of respective users associated with the power sources and the consumption loads, or the pre-set filter element is configured to apply a hashing processing to at least the data representing allocation of the generated power to the consumption load.

14. The system of claim 13, wherein the pre-set filter element is configured to apply a hashing processing to at least the data representing allocation of the generated power to the consumption loads.

15. The system of claim 14, wherein the hashing processing comprises dividing an allocation time series associated with a consumption load into a plurality of publication time series such that the sum of the plurality of publication time series equals the allocation time series, wherein the publication data includes data representing the respective publication time series and the hashing processing comprises decomposing an allocation time series associated with a consumption load into its time components and encrypting each time component using a public key associated with the consumption load, and wherein the publication data includes a sum of corresponding encrypted time elements from respective allocation time series.

16. The system of claim 10, wherein the pairing of the generation time series with the one or more consumption loads comprises at least one of applying or modifying pre-set pairings, wherein the pairing of the generation time series with the one or more consumption loads comprises at least one of determining an unallocated portion of the power generated by the power sources based on the pre-set pairings or generating additional pairings based on the unallocated portion, wherein determining the unallocated portion of the power generated by the power sources comprises applying different priority level allocation processes in order of descending priority, and the priority level allocation processes comprise two or more of a reserved allocations process, a dedicated allocations process based on a forecaster, an allocations process for meeting targets for products according to decreasing priority, and an allocations process to non-priority products.

17. The system of claim 10, wherein the processor for pairing is configured to base the pairing on at least one of consumer specified quantities, or to calculate correlation coefficients among the power generation time series and power consumption time series.

18. The system of claim 10, wherein the means for determining the respective power generation time series is configured for at least one of measuring the respective power generation time series or statistically simulating the respective power generation time series.

19. A system for certifying generation and consumption transactional pairings over a contiguous power grid network, comprising:
   a database;
   a plurality of generation meters and consumption meters configured for measuring time series data into the database in real time;
   a processor for processing the measured time series data through an algorithm to derive a result in association with a set of meter pairings between the generation meters and the consumption meters; and a publishing platform for publishing the derived result in real time, at selected times or at selected time intervals and for publishing the algorithm to the public, wherein the algorithm is configured by obtaining user settings from users associated with the generation meters and the consumption meters.

\* \* \* \* \*

UNITED STATES PATENT AND TRADEMARK OFFICE
CERTIFICATE OF CORRECTION

PATENT NO. : 10,915,128 B2
APPLICATION NO. : 15/749528
DATED : February 9, 2021
INVENTOR(S) : Peloso et al.

Page 1 of 1

It is certified that error appears in the above-identified patent and that said Letters Patent is hereby corrected as shown below:

In the Specification

In Column 16, Line 15, delete "(1770," and insert --(1670,-- therefor

In the Claims

In Column 21, Line 31, in Claim 9, delete "claim 1;" and insert --claim 1,-- therefor In Column 22, Line 49, in Claim 17, delete "quantities," and insert --quantities-- therefor Signed and Sealed this
Eighth Day of February, 2022

Drew Hirshfeld
*Performing the Functions and Duties of the
Under Secretary of Commerce for Intellectual Property and
Director of the United States Patent and Trademark Office*